(12) United States Patent
Bhakta

(10) Patent No.: US 8,095,243 B2
(45) Date of Patent: Jan. 10, 2012

(54) POWER MONITORING AND CONTROL SYSTEM AND METHOD

(76) Inventor: Minesh Bhakta, Phoenix, AZ (US)

( * ) Notice: Subject to any disclaimer, the term of this patent is extended or adjusted under 35 U.S.C. 154(b) by 926 days.

(21) Appl. No.: 11/925,690

(22) Filed: Oct. 26, 2007

(65) Prior Publication Data

US 2008/0093100 A1 Apr. 24, 2008

Related U.S. Application Data

(63) Continuation-in-part of application No. 11/178,822, filed on Jul. 11, 2005, now Pat. No. 7,555,365.

(51) Int. Cl.
*G06F 19/00* (2011.01)

(52) U.S. Cl. .......................... 700/286; 361/3

(58) Field of Classification Search .................. 700/286, 700/292, 297–298, 21, 22, 279; 323/248, 323/271, 285; 315/149; 455/128; 439/372, 439/535, 620.21

See application file for complete search history.

(56) References Cited

U.S. PATENT DOCUMENTS

| | | | |
|---|---|---|---|
| 3,558,902 A | 1/1971 | Casey | |
| 3,846,671 A | 11/1974 | Johnson | |
| 3,868,546 A | 2/1975 | Gilbreath et al. | |
| 3,978,468 A | 8/1976 | Bond et al. | |
| 4,002,890 A | 1/1977 | Welin | |
| 4,011,482 A | 3/1977 | Seib | |
| 4,174,517 A | 11/1979 | Mandel | |
| 4,234,927 A | 11/1980 | First | |
| 4,264,960 A | 4/1981 | Gurr | |
| 4,287,468 A | 9/1981 | Sherman | |
| 4,328,482 A | 5/1982 | Belcher et al. | |
| 4,367,455 A | 1/1983 | Fried | |
| 4,377,754 A | 3/1983 | Thompson | |
| 4,398,178 A | 8/1983 | Russ et al. | |
| 4,418,333 A | 11/1983 | Schwarzbach et al. | |
| 4,437,771 A | 3/1984 | Cazzaniga | |
| 4,455,095 A | 6/1984 | Bleier | |
| 4,459,041 A | 7/1984 | Knauss et al. | |
| 4,525,634 A | 6/1985 | Southard | |
| 4,567,511 A | 1/1986 | Smith et al. | |
| 4,744,021 A | 5/1988 | Kristy | |
| 4,845,490 A | 7/1989 | Ward et al. | |
| 4,912,461 A | 3/1990 | Cenzano, Jr. et al. | |
| 4,996,513 A | 2/1991 | Mak et al. | |
| 5,005,187 A | 4/1991 | Thompson | |
| 5,031,082 A | 7/1991 | Bierend | |
| 5,170,068 A | 12/1992 | Kwiatkowski | |
| 5,194,858 A | 3/1993 | Erwin | |
| 5,227,762 A | 7/1993 | Guidette et al. | |
| 5,264,823 A | 11/1993 | Stevens | |
| 5,373,224 A | 12/1994 | Rabier et al. | |
| 5,498,946 A | 3/1996 | Plummer et al. | |
| 5,521,838 A * | 5/1996 | Rosendahl | 700/295 |
| 5,563,455 A * | 10/1996 | Cheng | 307/41 |
| 5,583,423 A | 12/1996 | Bangerter | |
| 5,614,811 A | 3/1997 | Sagalovich et al. | |
| 5,691,691 A | 11/1997 | Merwin et al. | |
| 5,880,677 A * | 3/1999 | Lestician | 340/3.1 |

(Continued)

*Primary Examiner* — Kidest Bahta
(74) *Attorney, Agent, or Firm* — Schmeiser Olsen & Watts LLP

(57) ABSTRACT

A system includes first and second controllers coupled together with a communication channel. The first controller provides a first signal to the second controller and the second controller provides a second signal to the first controller in response. The second signal includes information about an electrical load. At least one of the first and second controllers can be integrated with an electrical outlet.

43 Claims, 12 Drawing Sheets

U.S. PATENT DOCUMENTS

| | | | |
|---|---|---|---|
| 5,978,569 A * | 11/1999 | Traeger | 709/244 |
| 7,379,997 B2 * | 5/2008 | Ehlers et al. | 709/224 |
| 2003/0050737 A1 | 3/2003 | Osann | |
| 2006/0120008 A1 * | 6/2006 | Kreiner | 361/211 |
| 2008/0031026 A1 * | 2/2008 | Menas et al. | 363/78 |

* cited by examiner

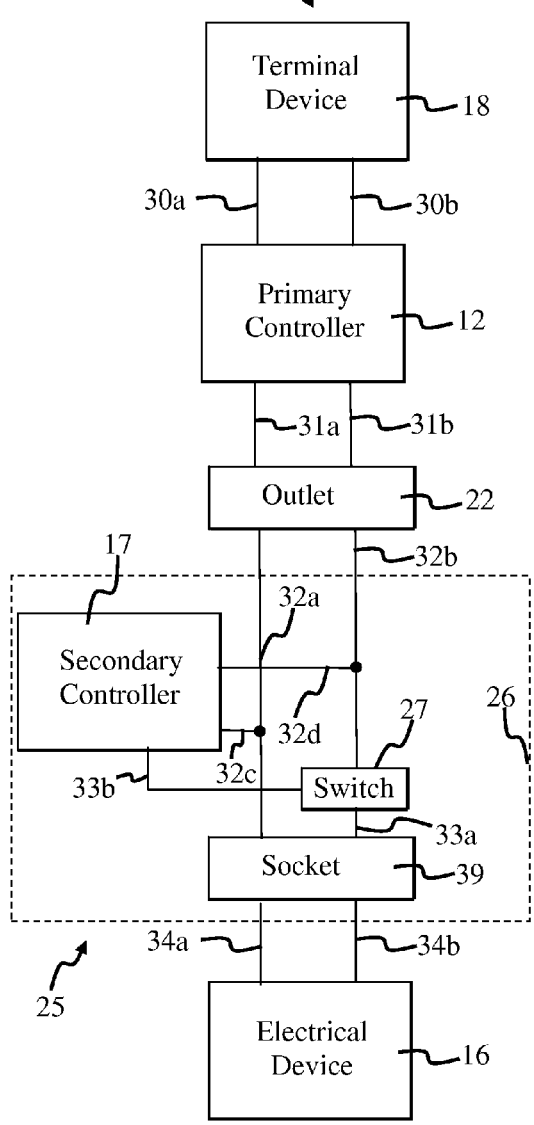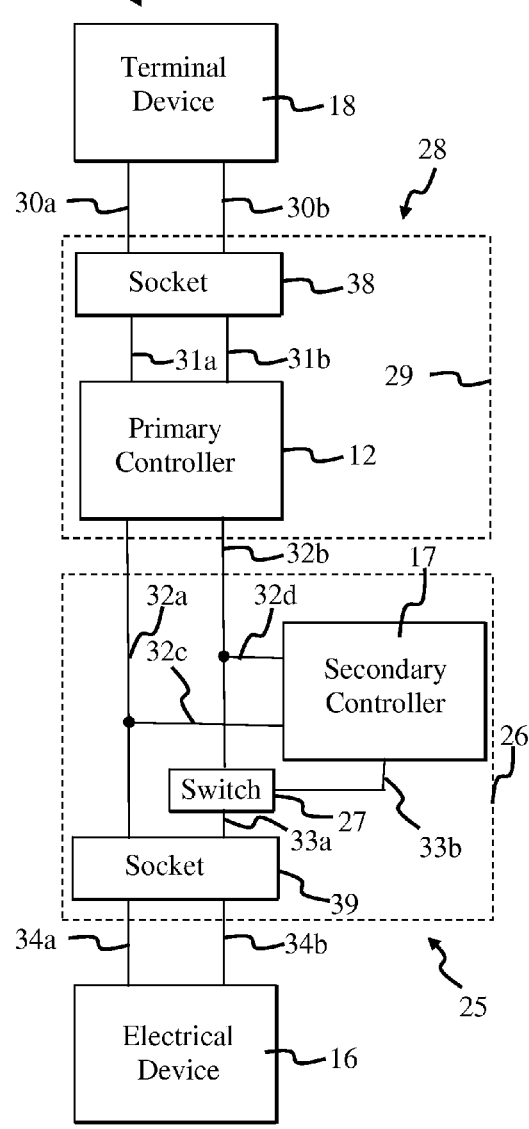

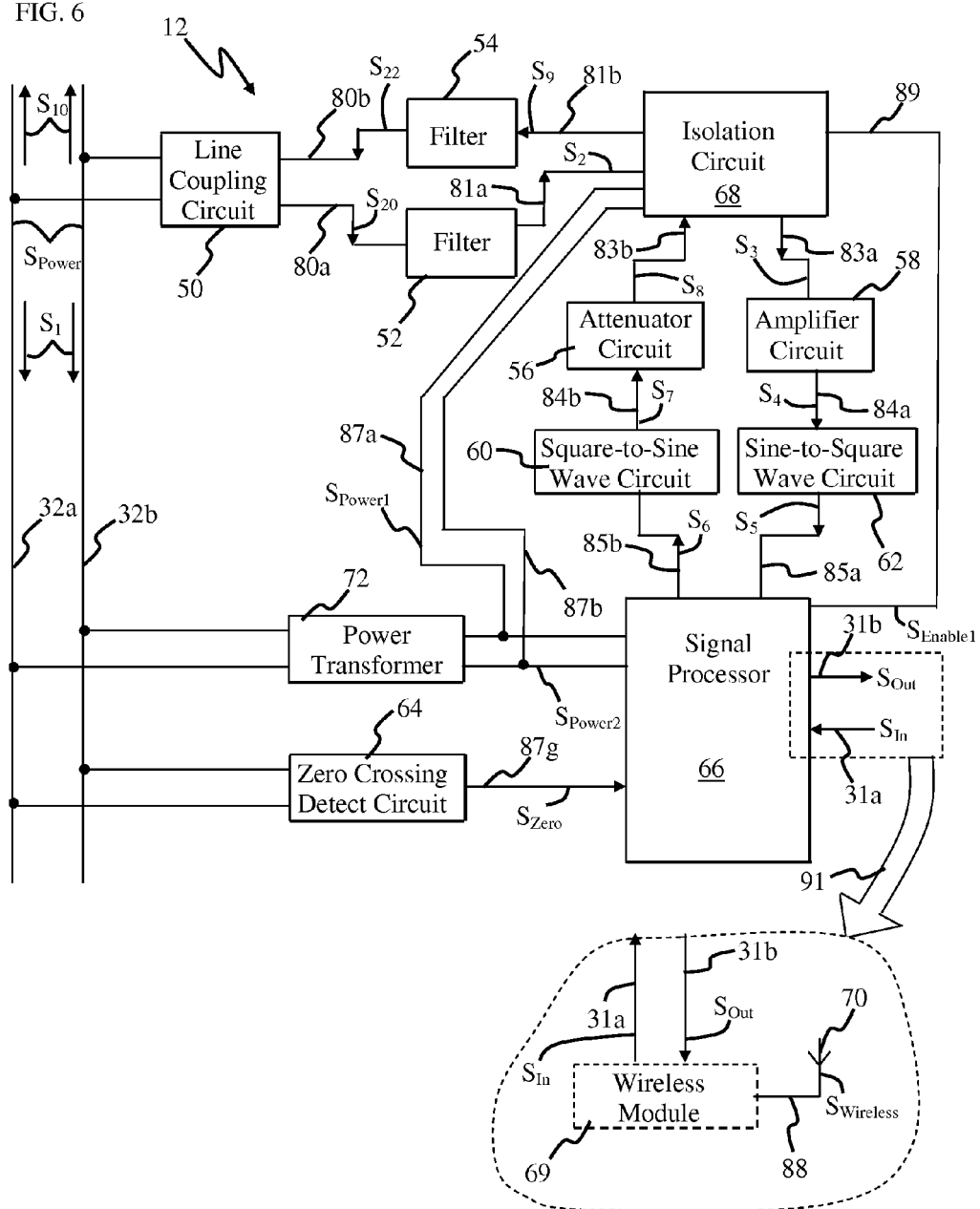

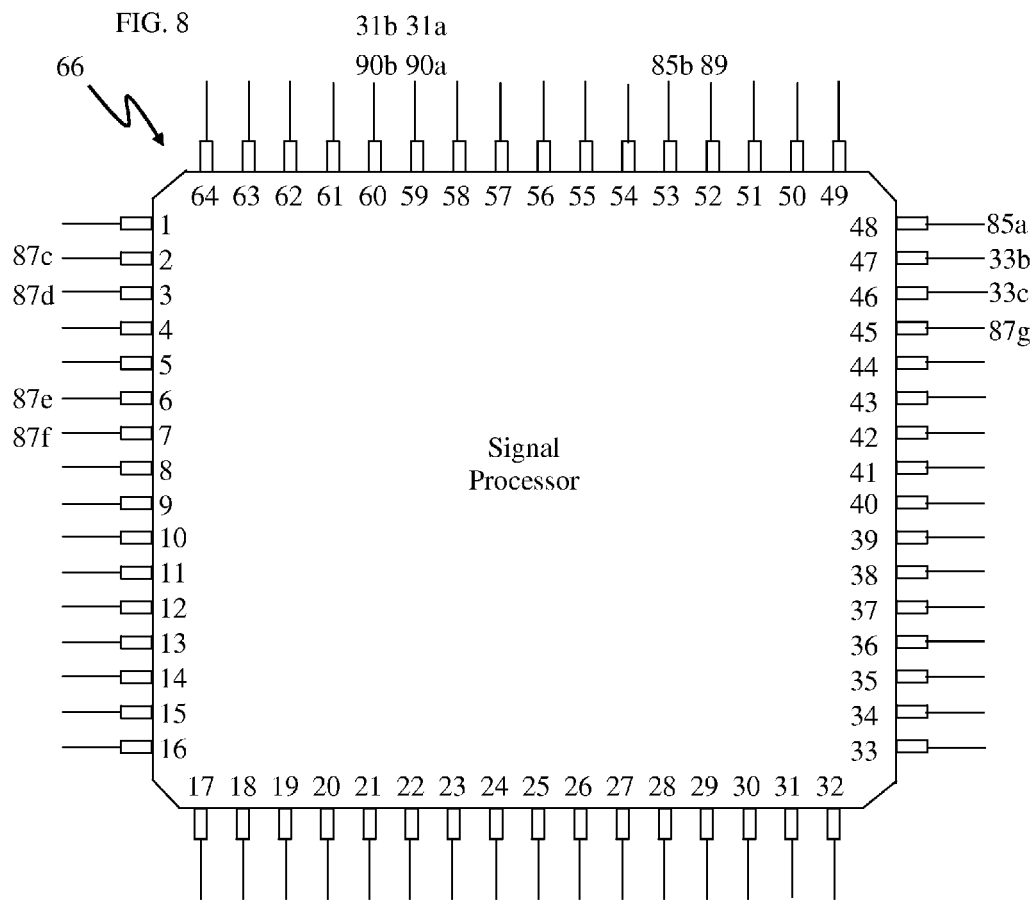
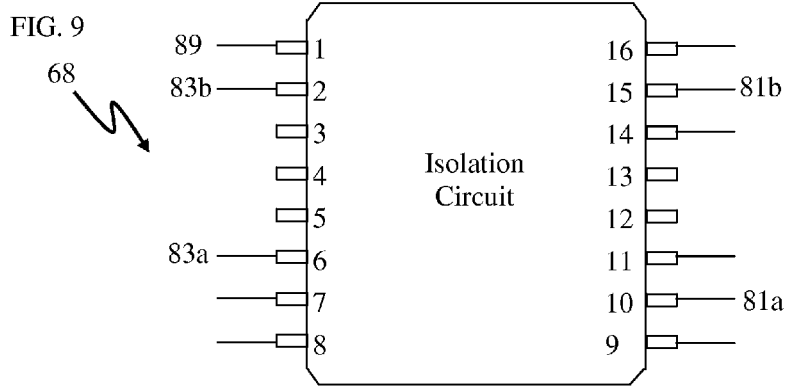

POWER MONITORING AND CONTROL SYSTEM AND METHOD

CROSS-REFERENCE TO RELATED APPLICATIONS

This application is a continuation-in-part of U.S. patent application Ser. No. 11/178,822 filed on Jul. 11, 2005, the contents of which are incorporated herein by reference.

BACKGROUND OF THE INVENTION

1. Field of the Invention

This invention relates generally to power regulation and, more particularly, to monitoring and controlling the operation of electrical devices.

2. Description of the Related Art

Energy monitoring and control systems are widely used to provide centralized monitoring and control of the loads in electrical systems. In buildings, the loads typically include a number of devices and sub-systems, the most prominent of which from an energy consumption standpoint include the heating, cooling, and lighting systems. Energy monitoring and control systems are rapidly becoming a desired element of the electrical system in small facilities, such as homes, and in large facilities, such as factories, hotels, offices, schools, hospitals, and public buildings. One reason is because there is an ongoing emphasis on energy conservation and a demand for increased effectiveness and reduced cycle time in finding and correcting load problems. There is also an emphasis on decreasing utility costs by using electrical devices less and by eliminating inefficient devices and replacing them with more efficient ones.

However, as of yet there is not a satisfactory way of accurate knowing the electrical power used by various household appliances so that inefficient uses of energy can be eliminated. Since budget planning depends on the amount of energy used during different periods such as the time of day, day of week, or season of the year, it is advantageous to know how much energy is used during various time periods and which particular devices use the most energy. While it is possible to obtain a monthly, daily, or weekly total for aggregate home energy use by reading the outside utility meter, such a practice is awkward and cumbersome. Furthermore, the only information that can be obtained from most utility meters is the total energy used. It generally cannot be determined which particular devices contribute the most to the total amount of energy used within any given time frame.

Another emphasis has been on controlling the operation of electrical devices to better control the amount of energy they use. In the past, systems have been available for automatically controlling certain household appliances from a central location. These systems typically use a power line modem, which is a transmitter/receiver capable of operating over conventional AC 120/240 volt wiring. Examples of these types of systems are shown in U.S. Pat. No. 4,174,517 to Mandell and U.S. Pat. No. 4,418,333 to Schwarzbach. In both of these systems, a control unit can be programmed to initiate certain functions within various appliances depending upon the time of day. For example, lights can be programmed to automatically turn on at dark and a coffee maker can be programmed to automatically turn on at a given hour in the morning. However, neither Schwarzbach nor Mandell provides any way for monitoring energy usage of the various appliances or devices connected to either system. Accordingly, there is a need for a better power monitoring and control system.

BRIEF SUMMARY OF THE INVENTION

The present invention provides a system which includes first and second controllers in communication with each other. The first controller provides a first signal to the second controller and the second controller provides a second signal to the first controller in response. The second signal includes information about an electrical load.

The present invention also provides a system which includes first and second controllers coupled to first and second electrical outlets, respectively. A terminal device flows a control signal to the first controller through the first electrical outlet. A communication channel is coupled between the first and second controllers. An electrical load is coupled to the second electrical outlet. The first controller provides a first signal to the second controller and the second controller provides a second signal to the first controller in response. The second signal includes information about the operation of the electrical device.

The present invention further provides a method which includes steps of receiving a time varying waveform; determining a predetermined property of the time varying waveform during a predetermined time period; and assigning a symbol from a set of data symbols to the time varying waveform.

These and other features, aspects, and advantages of the present invention will become better understood with reference to the following drawings, description, and claims.

BRIEF DESCRIPTION OF THE DRAWINGS

FIGS. 4A and 4B are simplified block diagrams of other embodiments of a power monitoring and control apparatus;

FIG. 6 is a simplified block diagram of one embodiment of the primary controller included in the power monitoring and control apparatus of FIGS. 4A and 4B;

FIG. 8 is a top view of one embodiment of a digital signal processor included in the primary and secondary controllers of FIGS. 6 and 7;

FIG. 9 is a simplified top view of one embodiment of an isolation circuit included in the primary and secondary controllers of FIGS. 6 and 7;

DETAILED DESCRIPTION OF THE INVENTION

Figure 1:
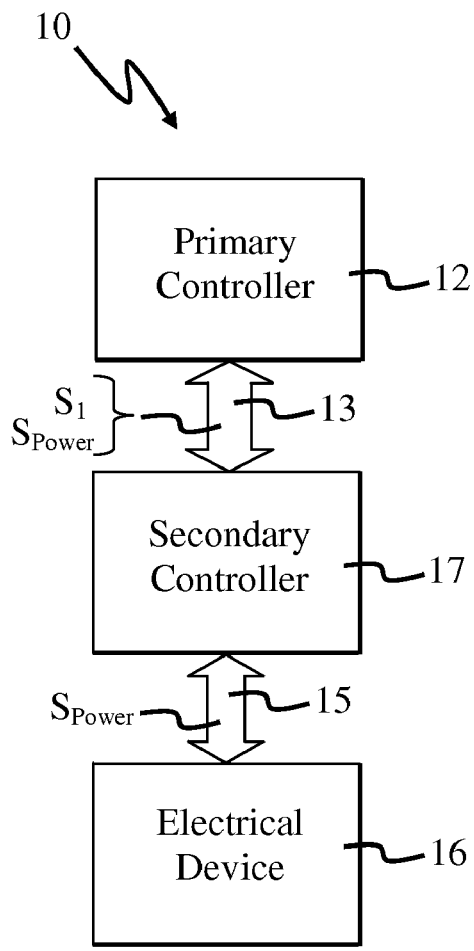
FIG. 1 is a simplified block diagram of one embodiment of a power monitoring and control apparatus in accordance with the present invention.

FIG. 1 is a simplified block diagram of a power monitoring and control system 10, in accordance with the present invention. It should be noted that like reference characters are used throughout the several views. System 10 is used to monitor and/or control the operation of one or more electrical devices. This is desirable because, for many different reasons, the operation of an electrical device is expensive. One reason the operation is expensive is because electrical power is expensive and the general trend is for it to increase in cost. Another reason the operation is expensive is because the electrical device has a certain lifetime after which it fails and needs to be replaced. The lifetime tends to decrease the more the electrical device is used so in some instances it is desirable to turn it off when not needed so its lifetime will not decrease as rapidly.

In this embodiment, the performance and/or efficiency of the electrical device is monitored by system 10, which is desirable because the performance typically changes with time as the device's lifetime decreases. Hence, by monitoring the electrical device's performance and/or efficiency, it can be determined whether or not it is approaching the end of its useful lifetime. This can be done because electrical devices are generally manufactured to operate within a particular range of power consumption, voltage, current, and temperature. When the electrical device is operating outside one or more of these ranges, then this is often an indication that the electrical device is reaching the end of its useful lifetime and is about to fail. Further, newer and more efficient electrical devices are typically being developed so system 10 can be used to determine whether it is more cost effective to replace an old electrical device with a newer and more efficient one.

System 10 is useful in many different settings. For example, it can be used at home, in an office, or another setting to monitor and control the operation of electrical devices typically used in these places. The electrical device can be any type of electrical load, such as an appliance, television, computer, air conditioner, lamp, hair drier, refrigerator, etc. which are generally powered by an electrical outlet. The electrical device can also include wireless sensors, such as a motion sensor, smoke detector, temperature sensor, air pressure/quality sensor, and a switch sensor.

In one particular example, system 10 is used to monitor and control the electrical devices in the rooms of a hotel. If the room is currently unoccupied, then system 10 can turn one or more of the electrical devices in this room off to reduce operating costs. If the room is going to be occupied, then one or more of the electrical devices in the room can be provided with power by system 10 so they can be used by the occupants. If the room is currently being occupied, then system 10 can monitor and/or control the operation of the devices.

In another example, system 10 is used to determine the amount of power consumed over a particular period of time by the electrical devices in an office, home, or another building. This is desirable because sometimes there are two rates for electrical power, a low rate and a high rate. In some instances, the low rate is paid when the total power usage is below a predetermined threshold power value and the high rate is paid when the total power usage is above the predetermined threshold power value. Since it is desirable for the consumer to pay the lower rate, system 10 can be used to determine the total power usage so it can be compared to the predetermined threshold power value. In this way, the consumer will know how much power they can use before they go above the threshold power value and have to pay the higher rate.

In this embodiment, system 10 includes a primary controller 12 in communication with a secondary controller 17 through a communication channel 13. Secondary controller 17 is in communication with an electrical device 16 through a communication channel 15. Communication channels 13 and 15 can be of many different types. In this example, they include conductive lines, such as AC 120 volt wiring, which is typically used in building construction to flow signals therethrough. In other examples, however, channels 13 and 15 can be of other types which power and/or control signals can flow. For example, they can be optical fibers, wireless links, etc., or combinations thereof. In one example, power signals can go through the electrical wires in channel 13 and control and monitoring signals can be sent through a wireless channel in channel 13.

One advantage of system 10 is that primary controller 12 can be positioned at one location and secondary controller 17 can be positioned at another location. For example, the locations can be at different positions in the same room or in different rooms in the same building. In other examples, the locations can even be in different buildings. In this way, system 10 can provide remote monitoring and/or controlling of device 16.

In operation, channel 13 flows a power signal $S_{Power}$ and a signal $S_1$ between controllers 12 and 17 and channel 15 flows $S_{Power}$ to electrical device 16. Signal $S_{Power}$ provides power to controllers 12 and 17 and electrical device 16 and signal $S_1$ typically includes control and monitoring signals. The control signal in $S_1$ allows controllers 12 and 17 to control the operation of electrical device 16 and the monitoring signal in $S_1$ provides information to controllers 12 and 17 about the operation of device 16. The information can be, for example, about the performance and efficiency of electrical device 16. Power signal $S_{Power}$ is typically a 120 V AC signal with a 60 Hertz (Hz) frequency, which is the United States standard. However, it should be noted that $S_{Power}$ can have different parameters which generally depend on the application and the country or location at which the power is provided. For example, many countries in Europe use 230 V at 50 Hz and Japan uses 100 V at 50 Hz or 60 Hz. Further, in the U.S. some heavy appliances use 240 volts at 60 Hz.

In this embodiment, controllers 12 and 17 include both analog and digital circuitry (not shown). The circuitry is coupled to channel 13 and separates signal $S_1$ from $S_{Power}$ so that $S_{Power}$ does not damage the circuitry and so $S_1$ can be processed. After it is processed, signal $S_1$, with the same of different information, is then provided back to channel 13 and flowed to controller 12. In this way, control and monitoring signals are flowed between controllers 12 and 17 to control and monitor the operation of electrical device 16.

In one example of operation, controller 12 sends signal $S_1$ to controller 17 through channel 13. In response to this signal, controller 17 performs one or more tasks. In one task, controller 17 turns electrical device 16 on and/or off as desired. In some examples, controller 17 can do this by activating or deactivating a switch (not shown) coupled to electrical device 16. In another task, controller 17 determines the performance parameters of electrical device 16. The performance parameters can include, among others, the temperature of operation, power consumption, power consumption as a function of time, voltage, current, power factor and/or frequency of operation of electrical device 16. Parameters, such as the power factor and power consumption are typically determined by secondary controller 17 using the current and voltage of device 16, but in other examples, they can be determined by primary controller 12. An advantage of having secondary controller 17 determine these parameters is that they will be more up-to-date in case electrical device 16 fails and can provide a better indication of the operation of device 16 before it failed. Having more up-to-date information is useful for troubleshooting device 16 to determine its cause of failure.

Figure 2:
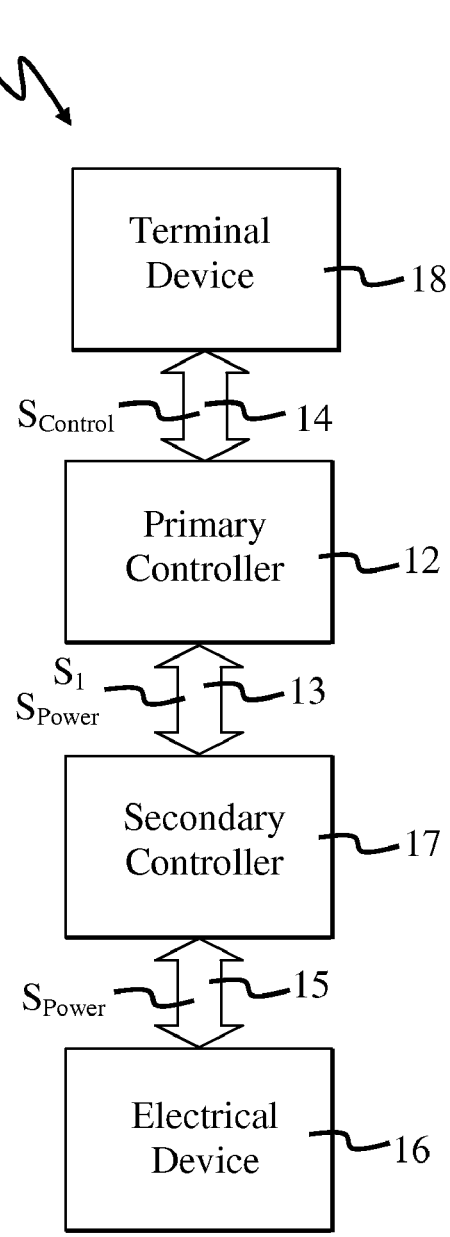
FIG. 2 is a simplified block diagram of another embodiment of the power monitoring and control apparatus of FIG. 1.

FIG. 2 is a simplified block diagram of a power monitoring and control system 11 in accordance with the present invention. System 11 is similar to system 10 discussed above. One difference, however, is that it includes a terminal device 18 in communication with primary controller 12 through a communication channel 14. Communication channel 14 can be the same or similar to communication channels 13 and 15 discussed above. Terminal device 18 can be of many different types. For example, it can be a laptop computer, desktop computer, Pocket PC, Personal Digital Assistant (PDA), etc. and communication channel 14 can be a data cable, such as a phone cord, an Ethernet cable, a Universal Serial Bus (USB), or an RS-232 serial cable. In some examples, channel 14 can even be a wireless link so that device 18 and controller 12 communicate with each other wirelessly.

In operation, terminal device 18 sends a control signal $S_{Control}$ to primary controller 12 through communication channel 14. Signal $S_{Control}$ indicates to controller 12 what information (temperature, frequency, power, current, voltage, etc.) it wants about electrical device 16. Signal $S_{Control}$ can also indicate to controller 12 if it is desired to turn device 16 on or off. In response, primary controller 12 sends signal $S_1$ to secondary controller 17. In response to signal $S_1$, secondary controller 17 controls and/or monitors device 16, as discussed above with FIG. 1. In some instances, controller 17 sends information about device 16 back to controller 12 through channel 13. Controller 12 then provides this information to terminal device 18 through channel 14. One advantage of this embodiment is that terminal device 18 can run a software program to easily send and retrieve information and commands to controllers 12 and 17. Terminal device 18 also displays the information in a convenient manner for the user. In this way, terminal device 18 provides the user an interface with controllers 12 and 17. As mentioned above, controllers 12 and 17 can determine some of the performance parameters of device 16, but in this embodiment, these parameters can be determined by terminal device 18.

Figure 3A:
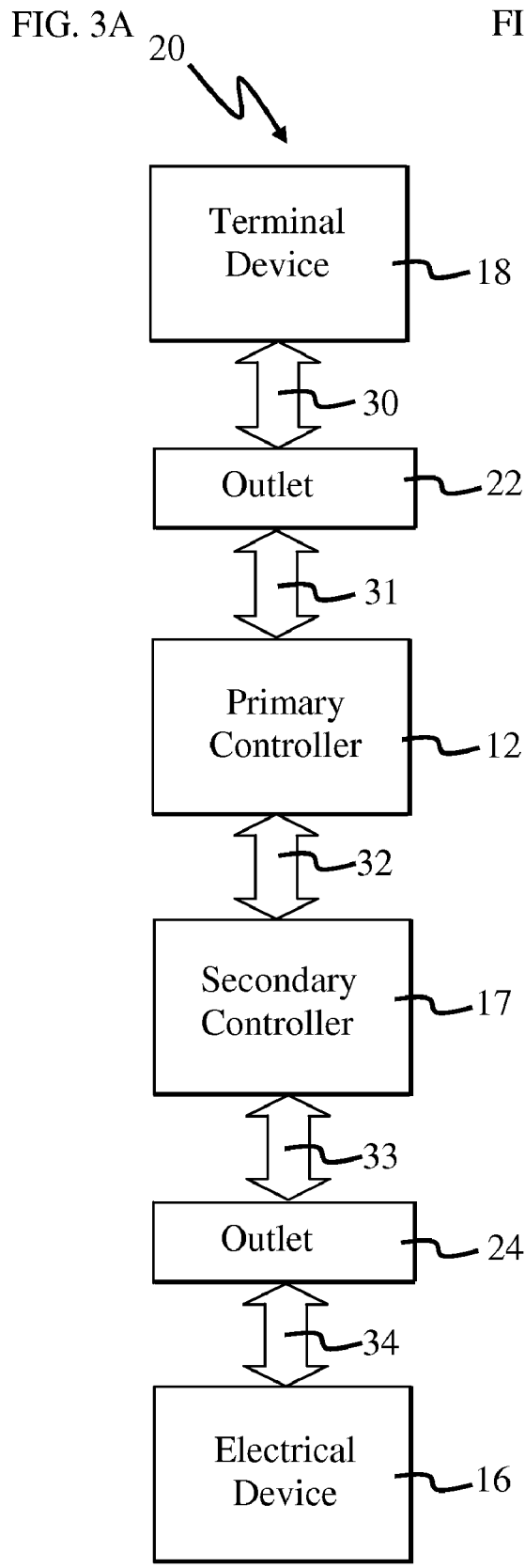
FIGS. 3A and 3B are simplified block diagrams of embodiments of a power monitoring and control apparatus.
Figure 3B:
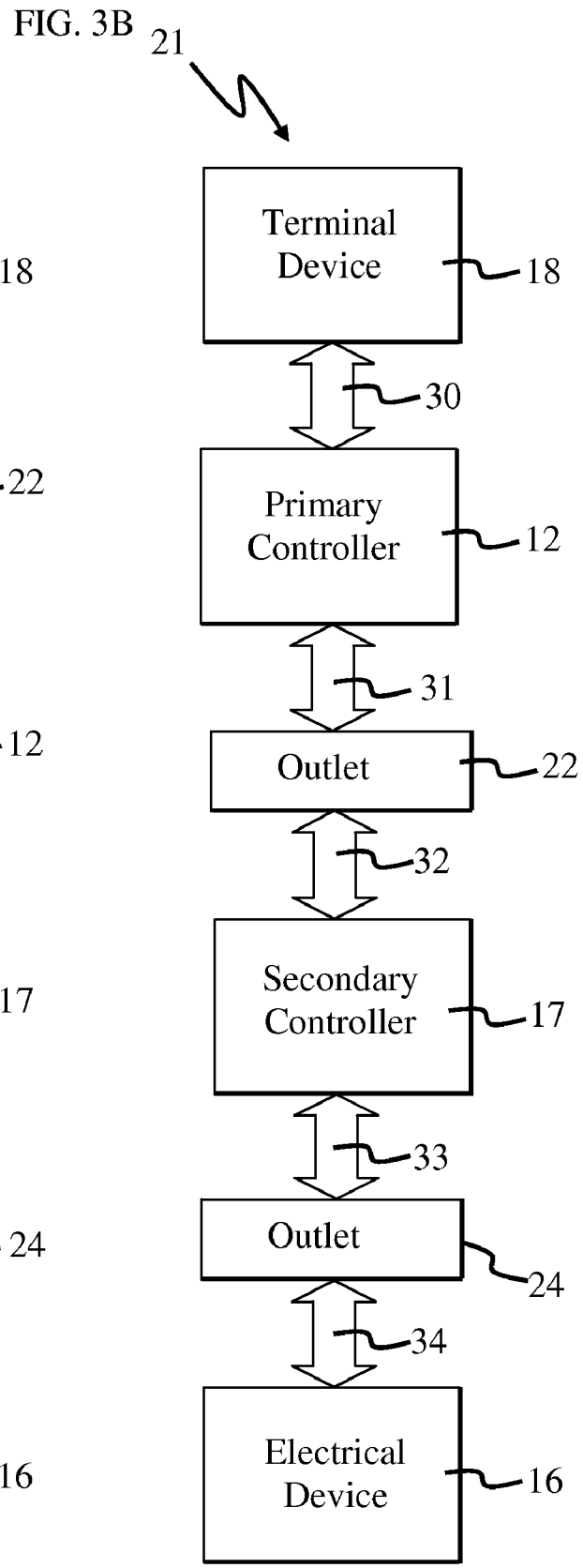

FIGS. 3A and 3B are simplified block diagrams of power monitoring and control systems 20 and 21, respectively, in accordance with the present invention. In this embodiment, system 20 is similar to systems 10 and 11 described above. One difference, however, is that it includes an outlet 22 between terminal device 18 and primary controller 12 and an outlet 24 between secondary controller 17 and electrical device 16. Terminal device 18 is in communication with outlet 22 through a communication channel 30 and primary controller 12 is in communication with outlet 22 through a communication channel 31. Secondary controller 17 is in communication with outlet 24 through a communication channel 33 and electrical device 16 is in communication with outlet 24 through a communication channel 34. Further, primary and secondary controllers 12 and 17 are in communication with each other through a communication channel 32.

In this embodiment, system 21 is similar to system 20 except that primary controller 12 is in communication with terminal device 18 through communication channel 30 and to outlet 22 through communication channel 31. Outlet 22 is in communication with secondary controller 17 through communication channel 32. Secondary controller 17 is in communication with outlet 24 through communication channel 33 and outlet 24 is in communication with electrical device 16 through communication channel 34.

It should be noted that communication channels 30-34 can be the same or similar to channels 13-15 discussed above in conjunction with FIGS. 1-2. In this embodiment, however, communication channel 34 is preferably a power cord known in the art which flows $S_{Power}$ between outlet 24 and electrical device 16. Further, communication channels 32-33 are preferably conductive lines typically used in electrical wiring for building construction. Further, in system 20, channel 30 is preferably a data cable which can be received by terminal device 18 and outlet 22 and channel 31 is preferably electrical wiring used in building construction. Similarly, in system 21, channel 30 is preferably a data cable which can be received by terminal device 18 and controller 17 and channel 31 is preferably a data cable which can be received by primary controller 12 and outlet 22. The operation of systems 20 and 21 are the same or similar to the operation of systems 10 and 11 discussed above in conjunction with FIGS. 1 and 2. In this embodiment, primary controller 12 is separate from outlet 22 and secondary controller 17 is separate from outlet 24. In other embodiments, however, primary controller 12 can be integrated with outlet 22 and/or secondary controller 17 can be integrated with outlet 24, as will be discussed in more detail presently.

FIGS. 4*a* and 4*b* are simplified block diagrams of power monitoring and control systems 40 and 41, respectively, in accordance with the present invention. In this embodiment, systems 40 and 41 are similar in structure and operation to systems 10, 11, 20, and 21 described above. One difference, however, is that the primary and/or secondary controllers are integrated with corresponding electrical outlets. One advantage of this is that systems 40 and 41 are more compact.

In FIG. 4*a*, terminal device 18 is in communication with primary controller 12 through conductive lines 30*a* and 30*b* and primary controller 12 is in communication with outlet 22 through conductive lines 31*a* and 31*b*. Outlet 22 is in communication with an outlet 25 through conductive lines 32*a* and 32*b* and outlet 25 is in communication with electrical device 16 through conductive lines 34*a* and 34*b*. In this embodiment, outlet 25 includes secondary controller 17 in communication with conductive lines 32*a* and 32*b* through conductive lines 32*c* and 32*d*, respectively. A switch 27 has an input connected to conductive line 32*b* and an output connected to a conductive line 33*a*. A conductive line 33*b* is connected between a control terminal of switch 27 and secondary controller 17 so that secondary controller can control its operation. Conductive lines 32*a* and 33*a* are connected to separate inputs of a socket 39 and separate outputs of socket 39 are connected to conductive lines 34*a* and 34*b*.

Figure 5A:
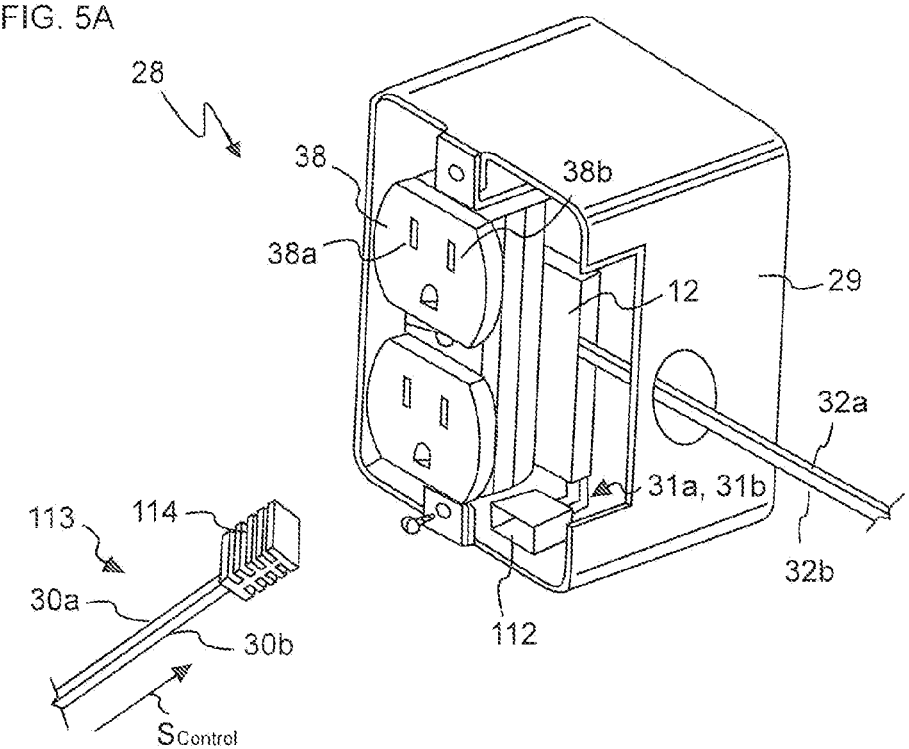
FIGS. 5A and 5B are simplified perspective views of electrical outlets, in accordance with the present invention, included in the power monitoring and control apparatus of FIGS. 4A and 4B.
Figure 5B:
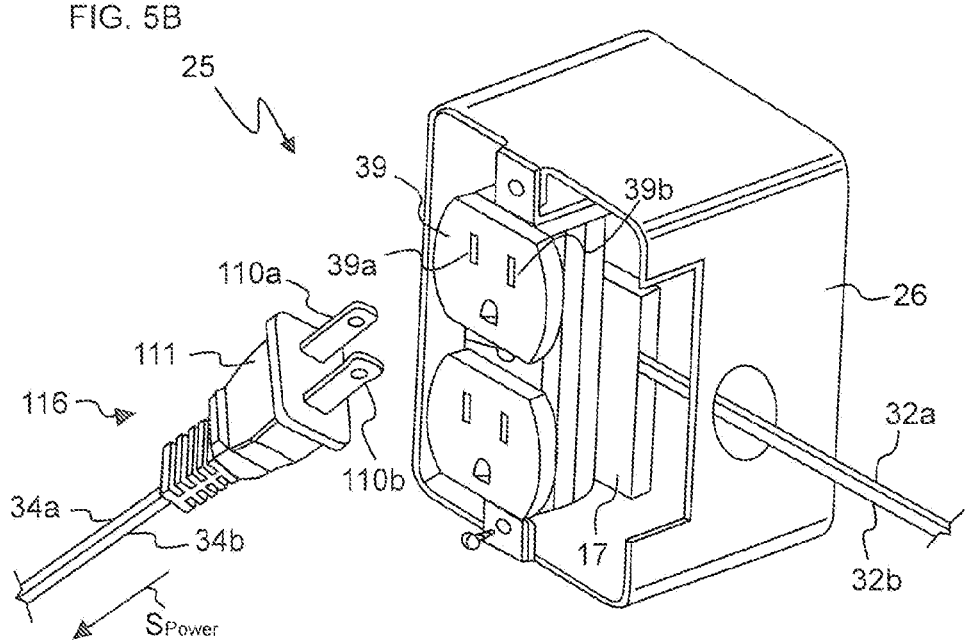

In accordance with the invention, secondary controller 17 and switch 27 are housed by an outlet housing 26 (See FIG. 5*b*). In this way, these components are integrated with outlet 25. In other examples, however controller 17 and/or switch 27 can be positioned outside housing 26. The switch can be of many different types. In this example, the switch is a relay, such as a bi-stable magnetic relay. The relay can flow $S_{Power}$ through socket 39 to electrical device 16 so it is on and interrupt the flow of $S_{Power}$ through socket 39 so it is off. In other examples, the switch can be a transistor or another type of switch known in the art.

In FIG. 4b, terminal device 18 is in communication with an electrical outlet 28 through conductive lines 30a and 30b. Electrical outlet 28 is in communication with electrical outlet 25 through conductive lines 32a and 32b. In this embodiment, outlet 28 includes a socket 38 with separate outputs connected to conductive lines 30a and 30b. Separate inputs of socket 38 are connected to separate inputs of primary controller 12 through conductive lines 31a and 31b. Separate outputs of primary controller 12 are connected to conductive lines 32a and 32b. In accordance with the invention, secondary controller 12 is housed by an outlet housing 29 (See FIG. 5a) included in outlet 28. In this way, this component is integrated with outlet 28.

In system 40, conductive lines 30a and 30b are preferably separate conductive wires typically included in an RS-232 cable which is known in the art. The RS-232 cable has a first connector on one end which can be received by a connector receptacle on terminal device 18. The RS-232 cable also has a second connector on its other end which can be received by an input connector receptacle on primary controller 12. Conductive lines 31a and 31b are preferably separate conductive wires typically included in a power cord. In this example, the power cord is modified so it has a connector on one end which can be received by an output connector receptacle on primary controller 12 and a connector on its other end which is preferably a plug that can be received by outlet 22.

In system 41, conductive lines 30a and 30b are preferably separate conductive wires typically included in an RS-232 cable. In this example, the cable is modified so it has a connector on one end, which can be received by a connector receptacle on terminal device 18, and a connector on its other end, which can be received by a connector receptacle on socket 38. It should be noted that the various connectors and connector receptacles can be of many different types known in the art. For example, they can be those used in phone lines, power cords, RS 232 cables, Ethernet cables, Universal Serial Bus (USB) cables, etc. Further, these connectors and connector receptacles can be provided in many different combinations on opposite ends of the same cable, such as in the modified cable and power cords discussed above.

FIGS. 5A and 5B show simplified perspective views of outlets 28 and 25, respectively, in accordance with the present invention. In FIG. 5A, outlet 28 includes housing 29 which houses controller 12. Socket 38 is held by housing 29 and has slots 38a and 38b with separate contacts (not shown) connected to separate terminals of controller 12 through conductive lines 31a and 31b (not shown). In this embodiment, signal $S_{Control}$ is provided to controller 12 through a cable 113. Cable 113 includes conductive lines 30a and 30b which are connected to a connector 114. Connector 114 is shaped to be received by a connector receptacle 112, which is coupled to controller 12 through conductive lines 31a and 31b.

In FIG. 5B, outlet 25 is similar to outlet 28. However, outlet 25 includes housing 26 which houses controller 17 and switch 27 (not shown). Further, outlet 25 does not include connector 112, although in other examples, it could. Instead, a cord 116 includes conductive lines 34a and 34b which are connected to housing 111. Cord 116 provides signal $S_{Power}$ to electrical device 16 (not shown). Conductive lines 34a and 34b extend through housing 111 where they are connected to prongs 110a and 110b, respectively. Prongs 110a and 110b can be received by slots 39a and 39b of socket 39 so that they connect to terminals (not shown) therein connected to conductive lines 32a and 33a (not shown).

FIG. 6 is a simplified block diagram of primary controller 12 included in the power monitoring and control systems of FIGS. 4A and 4B. It should be noted that the primary controllers shown in FIGS. 1-2 and 3A-3B can be the same or similar to the controller shown in FIG. 6. Controller 12 includes an AC line coupling circuit 50 which has separate inputs coupled to lines 32a and 32b. An output of circuit 50 is coupled to a filter 52 through a conductive line 80a and an output of filter 52 is coupled to an input of an isolation circuit 68 through a conductive line 81a. An output of isolation circuit 68 is coupled to an input of an amplifier circuit 58 through a conductive line 83a and an output of amplifier circuit 58 is coupled to an input of a sine-to-square wave circuit 62 through a conductive line 84a. An output of sine-to-square wave circuit 62 is coupled to an input of a signal processor 66.

An output of processor 66 is coupled to an input of a square-to-sine wave circuit 60 through a conductive line 85b and an output of circuit 60 is coupled to an input of an attenuator circuit 56 through a conductive line 84b. An output of attenuator circuit 56 is coupled to isolation circuit 68 through a conductive line 83b and an output of isolation circuit 68 is coupled to an input of a filter 54 through a conductive line 81b and an output of filter 54 is coupled to an input of AC line coupling circuit 50 through a conductive line 80b. Filters 52 and 54 are analog band-pass filters in this embodiment, but they could be other types of filters in other examples.

Lines 32a and 32b are also coupled to separate inputs of a zero crossing detect circuit 64. An output of circuit 64 is coupled to another input of processor 66 through a conductive line 87g. Conductive lines 32a and 32b are further coupled to separate inputs of a power transformer 72. Separate outputs of transformer 72 are coupled to conductive lines 87a and 87b. Conductive lines 87a and 87b are connected to processor 66 and isolation circuit 68 to provide power thereto in the form of signals $S_{Power1}$ and $S_{Power2}$, respectively. An enable terminal of processor 66 is connected to a conductive line 89 which extends between it and isolation circuit 68. Conductive line 89 flows a signal $S_{Enable1}$ between isolation circuit 68 and processor 66.

Signal processor 66 receives signal $S_{In}$ and transmits signal $S_{Out}$, which can be in signal $S_{Control}$ from terminal device 18, through separate terminals connected to conductive lines 31a and 31b, respectively. In some embodiments, signals $S_{In}$ and $S_{Out}$ can be transmitted and received through a wireless link, as indicated by substitution arrow 91. Here, conductive lines 31a and 31b are connected between separate terminals of processor 66 and a wireless module 69. A conductive line 88 is connected between module 69 and an antenna 70 so that signals can be transmitted therefrom wirelessly between processor 66 and terminal device 18. Wireless module 69 can be of many different types. In this example, it is a 2.4 GHz transceiver, but there are other wireless modules in the art that can be used. It should be noted that wireless module 69 can be positioned inside or outside of outlet housing 29 of FIG. 5A. The operation of controller 12 will be discussed in more detail below.

Figure 7:
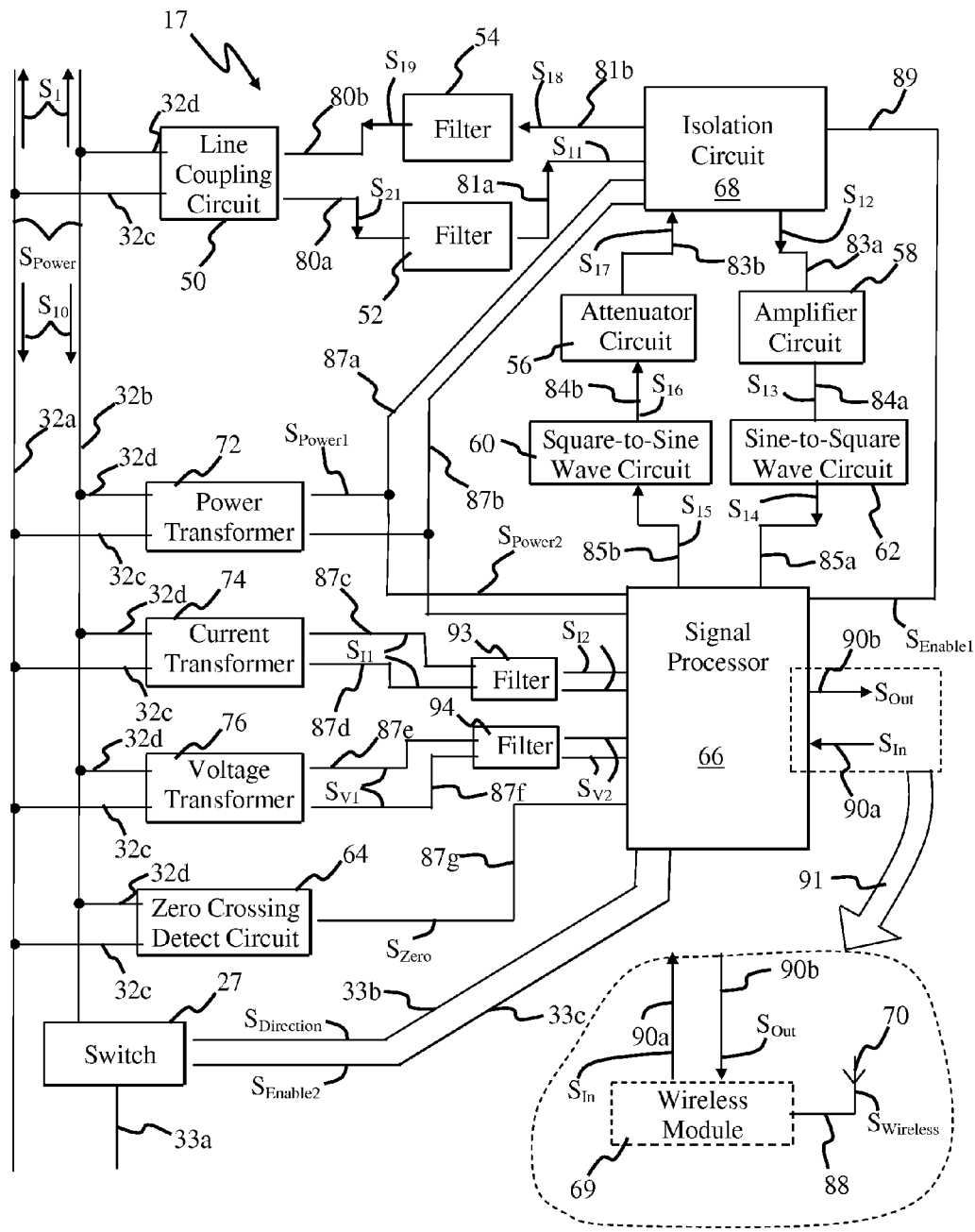
FIG. 7 is a simplified block diagram of one embodiment of the secondary controller included in the power monitoring and control apparatus of FIGS. 4A and 4B.

FIG. 7 is a simplified block diagram of secondary controller 17 included in the power monitoring and control systems of FIGS. 4A and 4B. It should be noted that the secondary controllers shown in FIGS. 1-2 and 3A-3B can be the same or similar to the controller shown in FIG. 7. In this embodiment, controller 17 is similar to primary controller 12 discussed above. However, controller 17 also includes a voltage transformer 76 and a current transformer 74, with each having separate inputs coupled to lines 32a and 32b through lines 32c and 32d, respectively. Separate outputs of transformer 74 are coupled to separate inputs of a filter 93 through conductive lines 87c and 87d. Separate outputs of transformer 76 are coupled to separate inputs of a filter 94 through conductive lines 87e and 87f. Outputs of filter 93 and 94 are coupled to separate inputs of processor 66. Filters 93 and 94 are analog low pass filters, but they can be other types of filters in other examples.

In this embodiment, switch 27 has an input coupled to line 32b and an output coupled to line 33a. Switch 27 also has separate terminals coupled to processor 66 through conductive lines 33b and 33c. Conductive lines 33b and 33c flow signals $S_{Direction}$ and $S_{Enable2}$, respectively, between processor 66 and switch 27. Signal processor 66 receives signals $S_{In}$ and $S_{Out}$ through separate terminals connected to conductive lines 90a and 90b, respectively. In some embodiments, signals $S_{In}$ and $S_{Out}$ can be transmitted and received through a wireless link, as indicated by substitution arrow 91, which is similar to that discussed above in conjunction with FIG. 6. Wireless module 69 of controller 17 can be used to receive a wireless signal from a sensor, which can be of many different types. For example, it can be a motion, temperature, pressure, and/or humidity sensor, among others. The sensor can be integrated with controller 17 and/or outlet 25 or it can be positioned outside of them. The operation of controller 17 is similar to that of controller 12 of FIG. 6, both of which will be discussed in more detail below. However, in this embodiment, controller 17 can determine the parameters of operation of electrical device 16.

FIG. 8 is a simplified block diagram of one embodiment of signal processor 66 included in primary and secondary controllers 12 and 17 of FIGS. 6 and 7, respectively. In this embodiment, signal processor 66 includes a Texas Instruments MSP430FE42x Mixed Signal Microcontroller. It should be noted that the TI MSP430FE42x Mixed Signal Microcontroller can be replaced with a similar circuit made by TI or another supplier. Hence, the use of the TI MSP430FE42x chip in this embodiment is for illustrative purposes only.

For controller 12, pin 45 is connected to conductive line 87g and pins 48 and 53 are connected to conductive lines 85a and 85b, respectively. Further, pins 59 and 60 are connected to conductive lines 31a and 31b, respectively. Controller 17 is connected similarly, only pins 59 and 60 are connected to conductive lines 90a and 90b, respectively. Further, pins 2 and 3 are connected to conductive lines 87c and 87d, respectively, and pins 6 and 7 are connected to conductive lines 87e and 87f, respectively. Further, pins 46 and 47 are connected to conductive lines 33c and 33b, respectively.

FIG. 9 is a simplified block diagram of one embodiment of isolation circuit 68 included in primary and secondary controllers 12 and 17 of FIGS. 6 and 7, respectively. In this embodiment, isolation circuit 68 includes an Agilent HCPL-800J PLC Powerline DAA Integrated Circuit (IC). It should be noted that the Agilent HCPL-800J PLC Powerline DAA IC can be replaced with a similar circuit which provides isolation between transmission and amplifier lines as desired in most powerline modem applications. Hence, the use of the HCPL-800J chip in this embodiment is for illustrative purposes only.

Isolation circuit 68 provides optical coupling between conductive lines 81a and 81b and conductive lines 83a and 83b. This is desired because optical coupling technology provides very high isolation mode rejection, facilitating excellent electromagnetic interference (EMI) and electromagnetic compatibility (EMC) performance. Application robustness is enhanced by the inherent properties of opto-isolation devices to effectively block the transfer of damaging surge transients from signal $S_{Power}$. Excellent transmitter performance is achieved with the use of a high efficiency, low distortion line driver stage. Transmitter robustness is further enhanced with integrated load detection and over-temperature protection functions.

In this particular example, isolation circuit 68 includes 16 pins. Pin 1 is connected to line 89 and pin 2 is connected to lines 83b so that it is coupled to the output of attenuator circuit 56. Pin 6 is connected to line 83a so that it is coupled to the input of amplifier circuit 58 and pin 15 is connected to line 81b so that it is coupled to the input of filter 54. Pin 10 is connected to line 81a so that it is coupled to the input of filter 52 and pin 7 is connected to a voltage power source, which can be through lines 87a and/or 87b so that it is coupled to power transformer 72. Pin 8 is coupled to a reference potential $V_{Ref1}$ so that the potential difference between pins 7 and 8 provide power to circuit 68. Further, pin 9 is coupled to a reference resistor $R_{Ref}$ to set a line driving biasing current. Resistor $R_{Ref}$ typically has a value of 24 kΩ, although it can have other values. Pin 11 is coupled to a reference capacitor $C_{Ref}$ to provide a desired stability to circuit 68. Pin 14 is coupled to a voltage power source $V_{cc2}$, which can be lines 87a and/or 87b so that it is coupled to power transformer 72. Pin 16 is coupled to a reference potential $V_{Ref2}$ so that the potential difference between pins 14 and 16 provide power to circuit 68. It should be noted that reference potentials $V_{Ref1}$ and/or $V_{Ref2}$ can be analog and/or digital current returns. More information about the MSP430FE42x and HCPL-800J chips can be found in their corresponding product data sheets which are incorporated herein by reference.

In operation, power transformer 72 in controllers 12 and 17 receives signal $S_{Power}$ on lines 32a and 32b, onto which signals $S_1$ or $S_{10}$ are superimposed. In response, transformer 72 outputs signals $S_{Power1}$ and $S_{Power2}$ on lines 87a and 87b, respectively. Since signal $S_{Power}$ is a high voltage, transformer 72 transforms this high voltage into a lower voltage which can be used to provide power to signal processor 66, isolation circuit 68, and or switch 27. In one example, signal $S_{Power}$ has a peak-to-peak (ptp) amplitude of 120 V and oscillates at 60 Hertz and signals $S_1$ and $S_{10}$ have amplitudes and 4 V and oscillate at 120 kilohertz (kHz). Transformer 72 transforms this 120 V power signal into $S_{Power1}$ and $S_{Power2}$ so that they have amplitudes between about 2 V and 5 V, although they can have amplitudes outside of this range. The particular signal amplitude will depend on the power needed for signal processor 66, isolation circuit 68, and or switch 27. For example, if switch 27 is a bi-stable magnetic relay, then it is typically powered by about 24 V.

In controller 17, current transformer 74 receives signal $S_{Power}$ on lines 32a and 32b and outputs signal $S_{I1}$ between lines 87c and 87d. Signal $S_{I1}$ corresponds to the current of signal $S_{Power}$ which corresponds to the current of electrical device 16. Signal $S_{I1}$ is filtered by filter 93 and provided to processor 66 as filtered signal $S_{I2}$. Similarly, voltage transformer 76 receives signals $S_{Power}$ on lines 32a and 32b and outputs signal $S_{V1}$ between lines 87e and 87f. Signal $S_{V1}$ corresponds to the voltage of signal of $S_{Power}$ which corresponds to the voltage of electrical device 16. Signal $S_{V1}$ is filtered by filter 94 and provided to processor 66 as filtered signal $S_{V2}$.

The operation of systems 40 and 41 using controllers 12 and 17 or FIGS. 6 and 7, respectively, will now be discussed in more detail. In FIG. 6, processor 66 receives signal $S_{In}$ on line 31a from terminal device 18. This can be done by having line 31 connected to device 18 or by using wireless module 69. In response, processor 66 codes and sends it as signal $S_6$ to square-to-sine wave circuit 60 on line 85b so that $S_6$ is a coded version of $S_{In}$. It will be discussed in more detail in conjunction with FIGS. 10A-10K how processor 66 codes and decodes some of the signals, such as $S_{In}$, $S_{Out}$, $S_{I2}$ and $S_{V2}$, it sends and receives. Circuit 60 converts the square wave signal $S_6$ to a sine wave signal and provides it to line 84b as signal $S_7$.

Signal $S_7$ is attenuated by attenuator circuit 56 and provided to line 83b as signal $S_8$. Signal $S_8$ is provided to line 81b as signal $S_9$ by isolation circuit 68 when it is enabled. Isolation circuit 68 is enabled at the appropriate time in response to $S_{Zero}$ and $S_{Enable1}$. The appropriate time is when $S_{Power}$ is near its zero value. In one example, signal $S_{Power}$ is near its zero value when it is within plus or minus a time $T_{Zero}$ from its zero value. However, other times can be used in other examples. Signal $S_9$ is filtered by filter 54 and provided to line 80b as signal $S_{22}$. Signal $S_{22}$ is coupled to lines 32a and 32b by line coupling circuit 50 as signal $S_{10}$ so that the signal between lines 32a and 32b includes signals $S_{Power}$ and $S_{10}$. Signal $S_{10}$ then flows to secondary controller 17, as shown in FIG. 7.

In FIG. 7, signals $S_{Power}$ and $S_{10}$ are received by controller 17. Line coupling circuit 50 separates signal $S_{10}$ from $S_{Power}$ and provides it to line 80a as signal $S_{21}$. Filter 52 filters signal $S_{21}$ and provides it to line 81a as signal $S_{11}$. In response to $S_{Zero}$, processor 66 enables isolation circuit 68 through signal $S_{Enable1}$ in a manner similar to that discussed above. In response to $S_{Enable1}$, isolation circuit 68 allows signal $S_{11}$ to pass from line 81a to line 83a as signal $S_{12}$. Signal $S_{12}$ is amplified by amplifier circuit 58 and provided to line 84a as signal $S_{13}$. In this example, signal $S_{13}$ is a sine wave that is converted to a square wave by sine-to-square-wave circuit 62 and provided as signal $S_{14}$ to line 85a. Signal $S_{14}$ is received by processor 66 where it is processed. This involves having processor 66 determine the control and/or monitoring information in signal $S_{14}$, which corresponds to the control and/or monitoring information in signal $S_{In}$ on line 31a of FIG. 6.

In response to the control and/or monitoring information in signal $S_{14}$, processor 66 can perform several different tasks. In one example, processor 66 determines the operational parameters of electronic device 16. It does this by receiving signals $S_{I2}$ and $S_{V2}$ from filters 93 and 94, respectively. Signals $S_{I2}$ and $S_{V2}$ include information about the voltage and current of electronic device 16. Processor 66 can use signals $S_{I2}$ and $S_{V2}$ to determine other operational parameters of device 16, such as its power consumption, power consumption as a function of time, power factor, frequency, etc. The control signal can include information so that processor 66 sends $S_{Direction}$ and $S_{Enable2}$ to switch 27 to open or close it as desired.

The desired operational parameters of device 16 are coded by processor 66 in a manner that will be described in more detail below in conjunction with FIGS. 10A-10O and this coded signal is provided to line 85b as signal S15. Circuit 60 converts the square wave signal $S_{15}$ to a sine wave signal and provides it to line 84b as signal $S_{16}$. Signal $S_{16}$ is attenuated by attenuator circuit 56 and provided to line 83b as signal S17. Signal S17 is provided to line 81b as signal $S_{18}$ by isolation circuit 68 when it is enabled in a manner similar to that discussed above. Signal $S_{18}$ is filtered by filter 54 and provided to line 80b as signal $S_{19}$. Signal $S_{19}$ is coupled to lines 32a and 32b by line coupling circuit 50 as signal $S_1$ so that the signal between lines 32a and 32b includes signals $S_{Power}$ and $S_1$. Signal $S_1$ then flows to primary controller 12, as shown in FIG. 6.

In FIG. 6, signals $S_{Power}$ and $S_1$ are received by controller 12. Line coupling circuit 50 separates signal $S_1$ from $S_{Power}$ and provides it to line 80a. Filter 52 filters signal $S_1$ and provides it to line 81a as signal $S_2$. In response to $S_{zero}$, processor 66 enables isolation circuit 68 through signal $S_{Enable1}$ in a manner similar to that discussed above. In response to $S_{Enable1}$, isolation circuit 68 allows signal $S_2$ to pass from line 81a to line 83a as signal $S_3$. Signal $S_3$ is amplified by amplifier circuit 58 and provided to line 84a as signal $S_4$. Signal $S_4$ is a sine wave that is converted to a square wave by sine-to-square-wave circuit 62 and provided as signal $S_5$ to line 85a. Signal $S_5$ is received by processor 66 where it is decoded in a manner described in more detail below. The decoded signal is then sent to terminal device 18 as signal $S_{out}$ on line 31b. Signal $S_{Out}$ can flow to terminal device 18 on line 31b or it can be sent using wireless module 69. After this, the process can repeat itself if desired.

In this embodiment, signals $S_5$, $S_6$, $S_{14}$, and $S_{15}$ are square wave signals and the others are sinusoidal. Signals $S_5$, $S_6$, $S_{14}$, and $S_{15}$ are square wave signals because they are processed by digital circuitry and the other signals are sinusoidal because it is generally more efficient to flow sinusoidal signals through conductive lines. It should be noted, however, that these signals can have other shapes, such as triangular. For the triangular wave example, circuit 60 is replaced with a square-to-triangle wave circuit and circuit 62 is replaced with a triangle-to-square wave circuit.

Figure 10A:
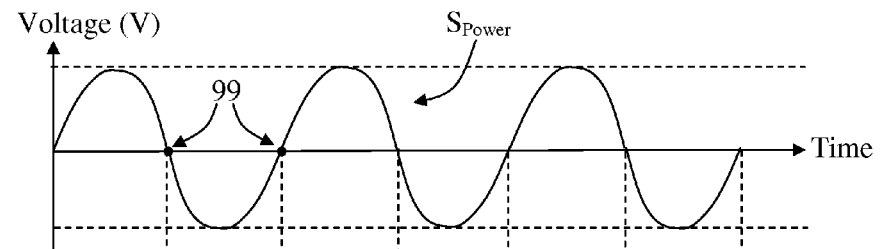
FIGS. 10A-10O are simplified graphs of the various signals shown in the primary and secondary controllers of FIGS. 6 and 7.
Figure 10B:
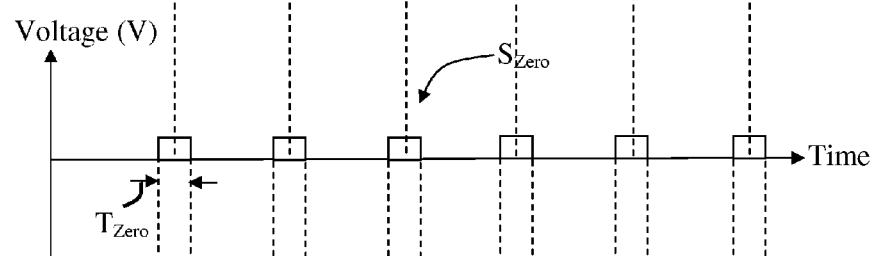
Figure 10C:
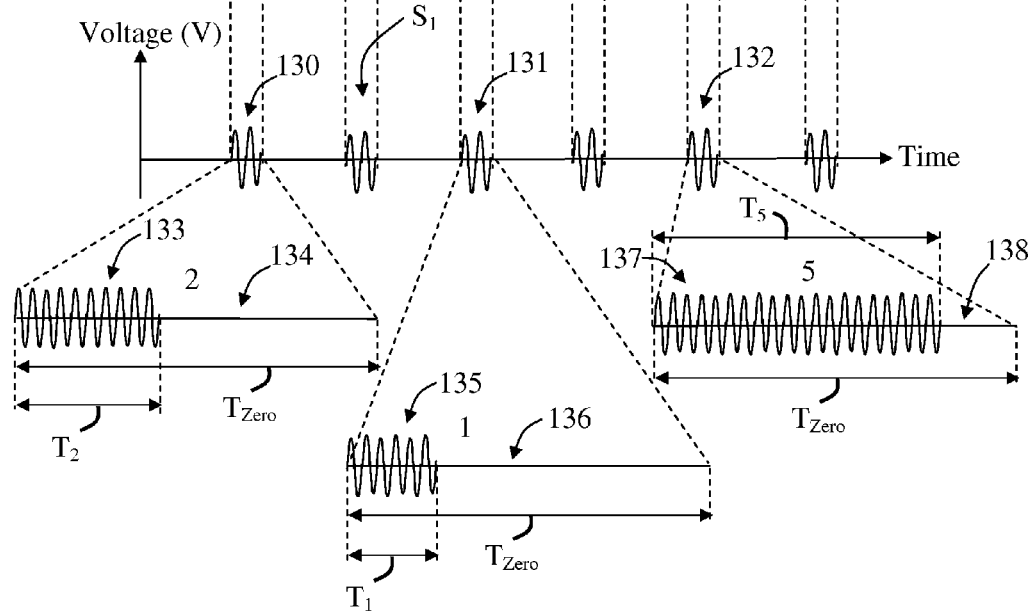
Figure 10D:
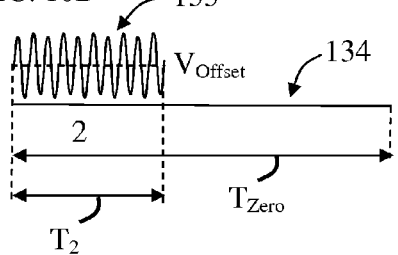
Figure 10E:
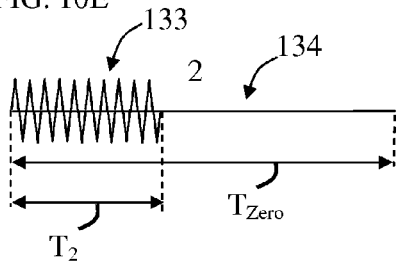
Figure 10F:
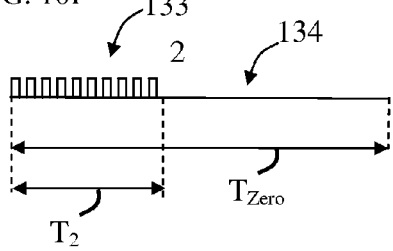
Figure 10G:
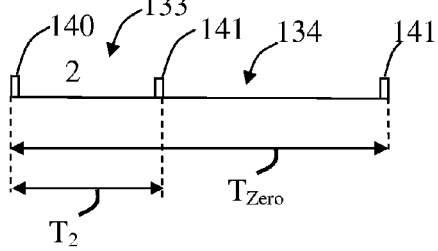
Figure 10H:
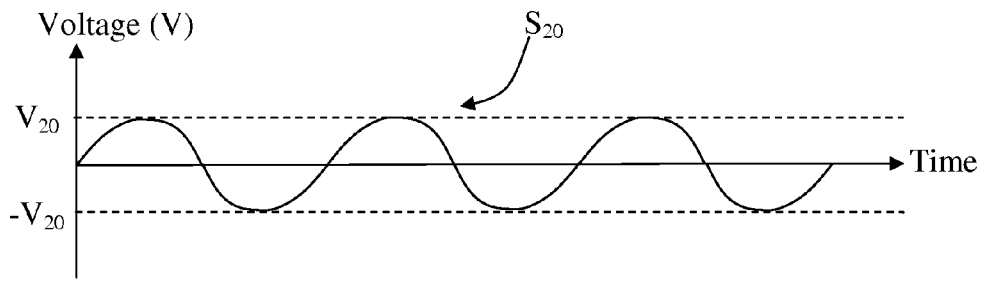
Figure 10I:
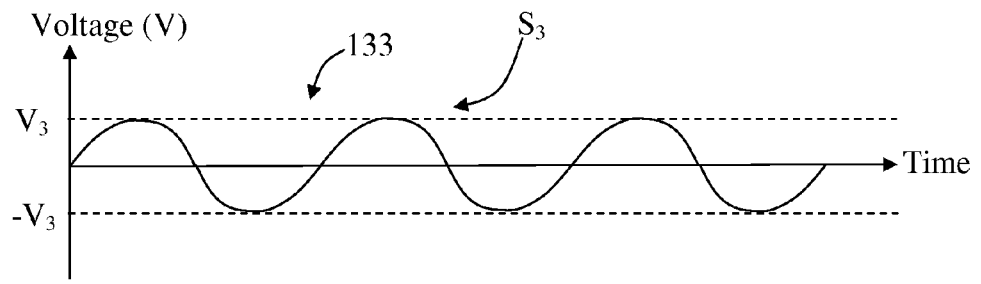
Figure 10J:
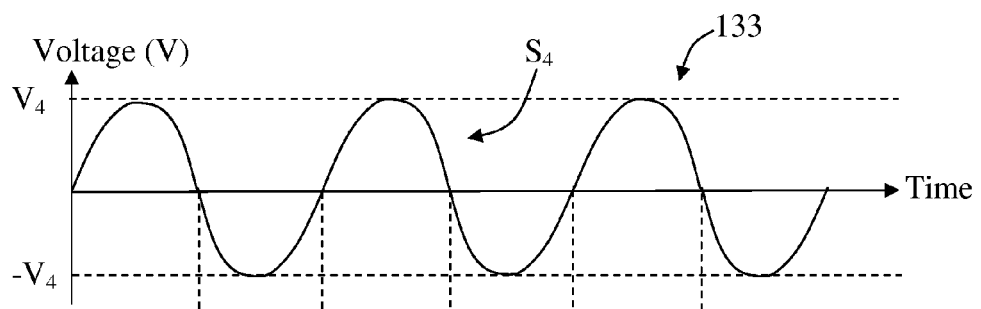
Figure 10K:
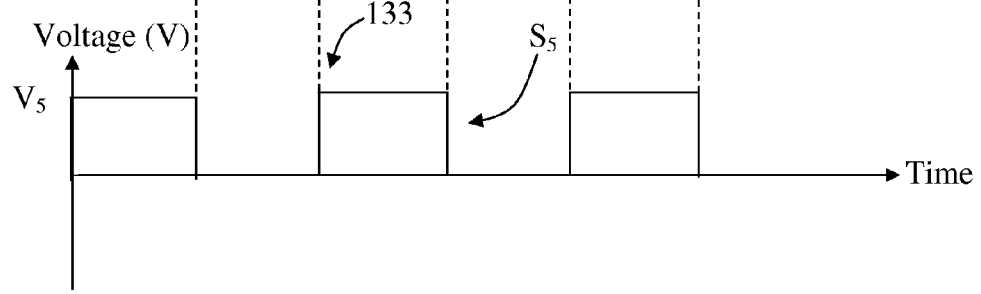
Figure 10L:
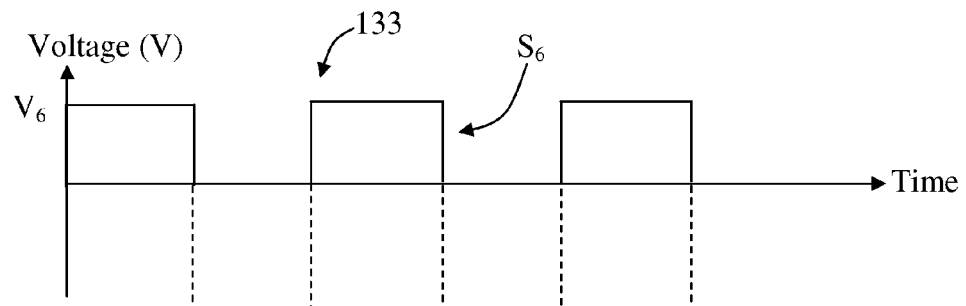
Figure 10M:
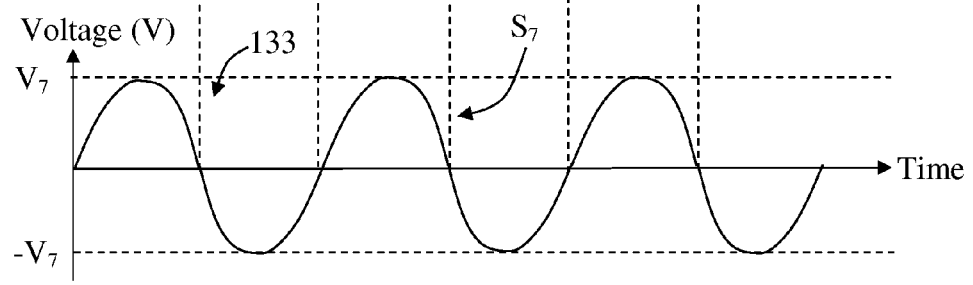
Figure 10N:
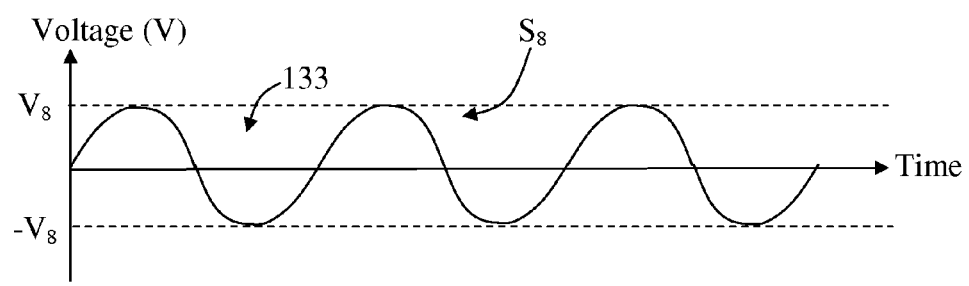
Figure 10O:
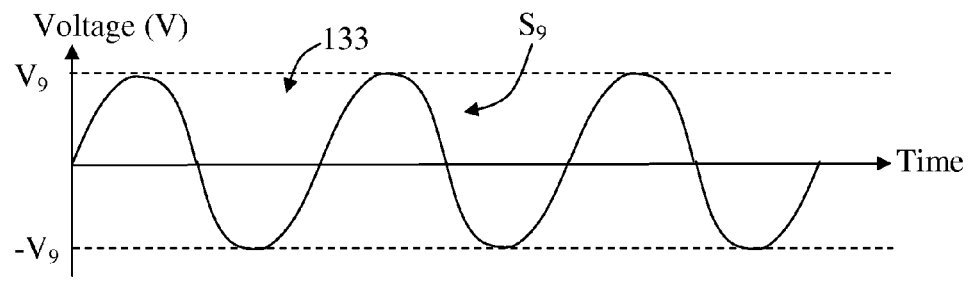

FIGS. 10A-10O are simplified graphs of signals in controller 12 and/or 14 as a function of time in accordance with the present invention. FIGS. 10A-10O are shown to better illustrate the operation of controllers 12 and 17 of FIGS. 6 and 7, respectively, and to show how processor 66 codes and decodes the various signals it sends and receives. FIG. 10A shows signal $S_{Power}$ which is sinusoidal and oscillates at a particular frequency. In this example, $S_{Power}$ is a 120V ptp AC signal that oscillates at 60 Hz so that its period T is about 16.6 milliseconds (ms) and half of its period (T/2) is about 8.3 ms. FIG. 10B shows signal $S_{Zero}$ which is a square wave with each pulse having a width of $T_{Zero}$. Signal $S_{Zero}$ is provided in response to an indication that signal $S_{Power}$ is zero or near zero. In this example, signal $S_{Power}$ is near zero when its amplitude is within plus or minus $T_{Zero}$ of its inflection point 99 (See FIG. 10A). However, in other examples, $S_{Power}$ can be defined as being near zero when it is within another predetermined time of inflection point 99.

FIG. 10C shows one example of signal $S_1$. Signal $S_1$ can have many different shapes depending on the information it is carrying. In general, signal $S_1$ is a train of oscillating signals which are separated from each other by one-half the period (T) of signal $S_{Power}$, denoted as T/2 (See FIG. 10A). In general, signal $S_1$ is sinusoidal with a frequency $\int_{carrier}$ for a portion of time within time $T_{Zero}$ and zero or constant for another portion of time $T_{Zero}$. In this example, signal $S_1$ is zero outside of $T_{Zero}$, although in some examples, it can have a constant non-zero value. It should be noted that signal $S_1$ is shown here as being sinusoidal, but it can have other shapes which oscillate a predetermined number of times within time $T_{Zero}$.

FIGS. 10D-10G show examples of signal $S_1$ with different shapes. In FIG. 10D, signal $S_1$ is sinusoidal, but has an offset voltage $V_{Offset}$ and in FIG. 10E, signal $S_1$ is triangular in shape. In FIG. 10F, signal $S_1$ has a square shape and in FIG. 10G, signal $S_1$ includes pulses. It should be noted that signal $S_1$ can have other shapes, but only a few are shown here for simplicity.

In FIG. 10C, frequency $\int_{Carrier}$ is 120 kHz and $T_{Zero}$ is 1.2 ms so that there are about 144 oscillations of $S_1$ within $T_{Zero}$ (1/120 kHz=8.3 microseconds (μs), 1.2 ms/8.3 μs=144) if $S_1$ oscillates throughout time $T_{Zero}$. It should be noted, however, that the carrier frequency and $T_{Zero}$ can have other values. For example, if the carrier frequency is 150 kHz and $T_{Zero}$ is 1.3 ms, then there are about 194 oscillations of $S_1$ within $T_{Zero}$ (1/150 kHz=6.7 (μs), 1.3 ms/6.7 μs=194).

As will be discussed in more detail presently, the portions of $S_1$ that are sinusoidal, zero, or constant depends on the information coded in $S_1$. For example, if it is desired to code the numbers zero (0) to nine (9) along with the alphabet, then 36 different codes are needed to distinguish between these symbols. This is because at least 10 different codes are needed to distinguish between the numbers zero through nine and at least 26 different codes are needed to distinguish between the letters A to Z. It should be noted, however, that the number of codes will depend on many other factors, such as the language used (English, French, Spanish, etc.), the number of symbols used (zero to nine, A to Z, and +, −, =, or any of the other ASCI characters). The number of codes can even depend on the number base used to represent the numbers. For example, the numbers can be one or zero for binary (base 2), zero to seven for octal (base 8), zero to nine for decimal (base 10), and zero to F for hexadecimal (base 16), among others. The number of codes can also depend on the acceptable error in coded and decoding the symbols as will be discussed in more detail below.

In this particular example, the codes are distinguished from one another by the number of cycles that occur in time $T_{Zero}$, wherein a cycle corresponds to the period of the signal. This is shown in Table 1 which lists the number of cycles and corresponding assigned symbol. For example, signal 130 in FIG. 10C is sinusoidal with 10 cycles in time $T_{Zero}$ in a region 133 and zero cycles in a region 134. From Table 1, signal 130 is assigned a symbol of '2' (two) since a number of cycles between 8 and 11 is coded as '2'. Similarly, signal 131 in FIG. 10C is sinusoidal with 6 cycles in time $T_{Zero}$ in a region 135 and zero cycles in a region 136. From Table 1, signal 131 is assigned a symbol of '1' (one) since a number of cycles between 4 and 7 is coded as '1'. Likewise, signal 132 in FIG. 10C is sinusoidal with 20 cycles in time $T_{Zero}$ in a region 137 and zero cycles in a region 138. From Table 1, signal 132 is assigned a symbol of '5' (five) since a number of cycles between 19 and 21 is coded as '5'. If the signal has no cycles or is constant, zero or otherwise, during time $T_{Zero}$, then the signal is assigned a symbol of '0' (zero). If the signal is sinusoidal throughout time $T_{Zero}$ so that it has 144 cycles, then it is coded as a symbol 'Z'. It should be noted that the values and symbols in Table 1 can be programmed into a memory chip (not shown). The memory chip can be non-volatile or random access memory in some examples. The values and symbols in Table 1 can even be determined from a look-up table.

In this example, each symbol is assigned four cycles. For example, the symbol 0 (zero) is assigned zero, one, two, and three cycles and the symbol 1 (one) is assigned

TABLE 1

| | Number of cycles | Percentage (%) | Value of Data |
|---|---|---|---|
| $T_0$ | 0 to 3 | 0.0 to 2.1 | 0 |
| $T_1$ | 4 to 7 | 2.8 to 4.9 | 1 |
| $T_2$ | 8 to 11 | 5.6 to 7.6 | 2 |
| $T_3$ | 12 to 15 | 8.3 to 10 | 3 |
| . | . | . | . |
| . | . | . | . |
| . | . | . | . |
| $T_8$ | 32 to 35 | 22 to 24 | 8 |
| $T_9$ | 36 to 39 | 25 to 27 | 9 |
| $T_A$ | 40 to 43 | 28 to 30 | A |
| $T_B$ | 44 to 47 | 31 to 33 | B |
| . | . | . | . |
| . | . | . | . |
| $T_Z$ | 140 to 143 | 97 to 100 | Z | four, five, six, and seven cycles. The number of cycles assigned to a particular symbol depends on the acceptable error in coded and decoding the information. The more cycles that are assigned to a particular symbol, the less the error is in encoding and decoding it. Further, the less cycles that are assigned to a particular symbol, the more the error is in encoding and decoding it.

For example, in one scheme, the number zero is assigned to a number of cycles between 0 and 72 and the number one is assigned to a number of cycles between 73 and 144 so that the information corresponds to binary data (base 2). The accuracy of this binary coded scheme is more accurate than the scheme of Table 1. This is because it is generally more difficult and less accurate to determine if the number of cycles is between zero and three ('0') or four and seven ('1'), for example, then it is to determine if the number of cycles is between 0 and 72 ('0') or 73 and 144 ('1'). However, an advantage of having a fewer number of cycles assigned to a particular symbol is that more different symbols can be represented, so that the data compression is increased. Further, many more different symbols can be coded in time $T_{Zero}$. For example, in the binary scheme, only two symbols can be coded in time $T_{Zero}$ (a '0' or a '1'), but in the scheme of Table 1, 36 different symbol can be coded in time $T_{Zero}$ (0 to 10 and A to Z). Hence, the transmission of information is faster.

It should be noted that there are several other ways to determine the symbol of the signal in time $T_{Zero}$. In the example above, the number of cycles of the sinusoid in time $T_{Zero}$ is determined. In another way, the percentage that the signal is sinusoidal in time $T_{Zero}$ can be determined. For example, signal 130 is sinusoidal for a time $T_2$ in time $T_{Zero}$. Since time $T_2$ is 10 cycles out of 144 total cycles, time $T_2$ is about 6.9% of time $T_{Zero}$. According to Table 1, signal 130 represents a '2' (two) since a signal that is sinusoidal between about 5.6 to 7.6 percent of $T_{Zero}$ is assigned the symbol '2'. Similarly, signal 131 is sinusoidal for a time $T_1$ in time $T_{Zero}$. Since time $T_1$ is 6 cycles out of 144 total cycles, time $T_2$ is about 4.2% of time $T_{Zero}$. According to Table 1, signal 130 represents a '1' (one) since a signal that is sinusoidal between about 2.8% to 4.9% of $T_{Zero}$ is assigned the symbol '1'. Further, signal 132 is sinusoidal for a time $T_5$ in time $T_{Zero}$. Since time $T_5$ is 20 cycles out of 144 total cycles, time $T_5$ is about 13.9% of time $T_{Zero}$. According to Table 1, signal 132 represents a '5' (five) since a signal that is sinusoidal between about 13.9% to 16% of $T_{Zero}$ is assigned the symbol '5'. In another way, the number of half cycles of the sinusoid or the number of peaks and/or valleys in the oscillating signal can be determined. In other examples, the amount of time that the signal is zero within time $T_{Zero}$ is determined (i.e. $T_{Zero}$-$T_2$) and compared to $T_{Zero}$ ($[T_{Zero}$-$T_2]/T_{Zero}$). This percentage is then used to determine the code in a manner similar to that described above.

FIG. 10G shows another way that the symbols can be coded. Here, time $T_2$ is determined by the occurrence of pulses 140 and 141. This can be done by using a timer or counter circuit. Once time $T_2$ is determined, it can be compared to time $T_{Zero}$ to determine the percentage of $T_2$ to $T_{zero}$. As discussed above, time $T_2$ is 10 cycles out of 144 total cycles, so time $T_2$ is about 6.9% of time $T_{Zero}$ and signal 130 represents a '2' (two) according to Table 1.

FIG. 10H shows signal S20 as being a sinusoidal signal with an amplitude of $V_{20}$. FIG. 10I shows signal $S_3$ as being a sinusoidal signal with an amplitude of $V_3$. FIG. 10J shows signal $S_4$ which is signal $S_3$ after it has been amplified by amplifier circuit 58. Signal $S_4$ has an amplitude of $V_4$ which is greater than $V_3$. FIG. 10K shows signal $S_5$ which is signal $S_4$ after it has been converted to a square wave by sine-to-square wave circuit 62. Signal $S_5$ has an amplitude of $V_5$. FIG. 10L shows signal $S_6$ which is a square wave. Signal $S_6$ has an amplitude of $V_6$. FIG. 10M shows signal $S_7$ which is signal $S_6$ after it has been converted to a sine wave by square-to-sine wave circuit 60. FIG. 10N shows signal $S_8$ which corresponds to signal $S_7$ after it has been attenuated by attenuator circuit 56. Signal $S_7$ has an amplitude of $V_7$ and signal $S_8$ has an amplitude of $V_8$ where $V_7$ is greater than $V_8$. FIG. 10O shows signal $S_9$ which is signal $S_8$ after it has been passed between lines 83b and 81b by isolation circuit 68. Signal $S_{10}$ is a filtered version of signal $S_9$. Signal $S_9$ is filtered to provide $S_{10}$ to remove unwanted modes that may be present in signal $S_9$.

It should be noted that the signals of FIG. 6 described above in conjunction with FIGS. 10A-10O are the same or similar to the signals of FIG. 7, but they are not shown for simplicity. Further, it should be noted that the various signals included in FIGS. 6 and 7 can have different amplitudes and frequencies. In one particular example, $S_{Power}$ has a ptp amplitude of about 120 V and oscillates at 60 Hz. The other signals oscillate at the carrier frequency, which in these examples is $f_{Carrier}$=120 kHz. In this example, signals $S_1$ and $S_{10}$ each have ptp amplitudes of about 4 V and signals $V_{20}$ and $V_{21}$ each have ptp amplitudes of about 5 mV ($V_{20}$=2.5 mV). Signals $S_3$ and $S_{12}$ have ptp amplitudes of about 100 mV ($V_3$=100 mV), although they typically have amplitudes in a range between 100 mV to 500 mV. Further, signals $S_4$ and $S_{13}$ each have ptp amplitudes of about 5 V ($V_4$=2.5 V) and signals $S_5$, $S_6$, and $S_{14}$, and $S_{15}$ each have amplitudes of 5 V ($V_5$=5 V, $V_6$=5 V). Signals $S_7$ and $S_{16}$ each have ptp amplitudes of 5 V ($V_7$=2.5 V) and signals $S_8$ and $S_{17}$ each have amplitudes of 200 mV ($V_5$=100 mV). Signals $S_9$, $S_{10}$, $S_{18}$, and $S_{19}$ each have ptp amplitudes of 4 V ($V_9$=2 V). It should be noted, however, that the amplitude and frequency values listed here are for illustrative purposes and they could have other values.

Figure 11:
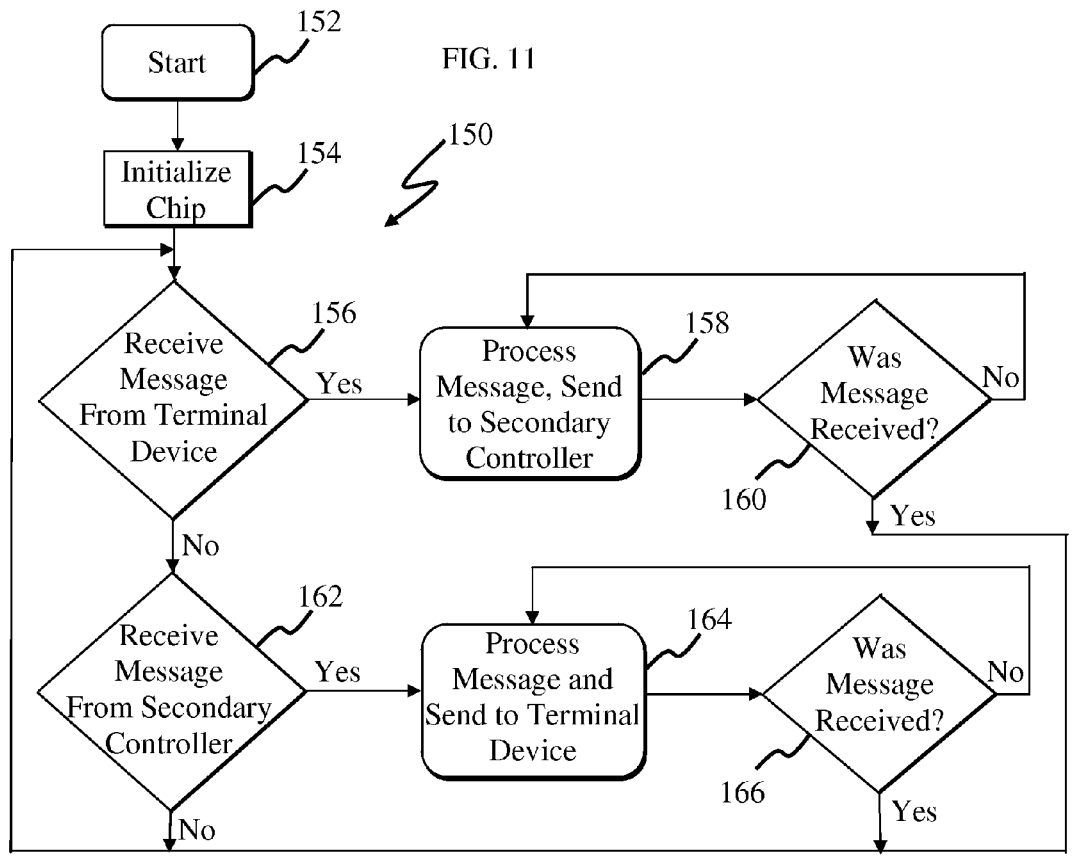
FIG. 11 is a simplified block diagram of one embodiment of a method of controlling the power using a power monitoring and control apparatus in accordance with the present invention.

FIG. 11 is a simplified block diagram of a method 150 of controlling and monitoring an electrical device using a power monitoring and control apparatus in accordance with the present invention. It should be noted that the steps in method 150 can be performed in other ways, but only one way is shown here for illustrative purposes. Method 150 starts at a step 150 and then initializes the primary and secondary controllers at a step 154. In a step 156, it is determined whether a first message has been received by the primary controller from a terminal device. If the first message has been received, then the first message is processed and sent by the primary controller to the secondary controller in a step 158. In a step 160, it is determined whether the first message from the primary controller has been received by the secondary controller. If it has, then control is sent back to step 156. If it has not, then control is sent back to step 158.

If the first message from the terminal device has not been received by the primary controller in step 156, then it is determined if a second message has been received by the primary controller from the secondary controller in a step 162. If it has been received, then the second message is processed and sent to the terminal device in a step 164. In a step 166, it is determined whether the second message from the secondary controller has been received by the primary controller and sent to the terminal device. If it has, then control is sent back to step 156. If it has not, then control is sent back to step 164.

Figure 12A:
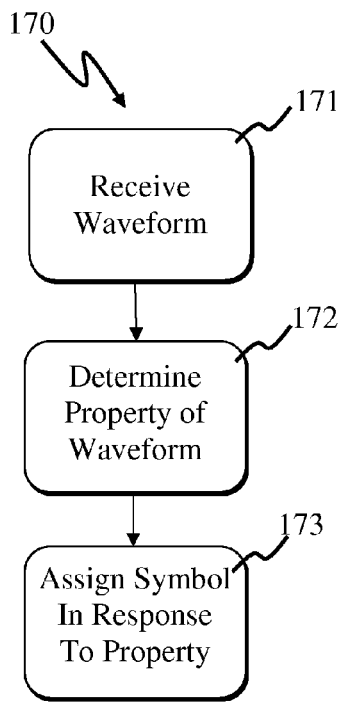
FIGS. 12A-12C are simplified block diagrams of a method of encoding a symbol in accordance with the present invention.

FIGS. 12A-12F are simplified block diagrams of methods of coding symbols and decoding waveforms in accordance with the present invention. In FIG. 12A, a method 170 of decoding waveforms includes a step 171 of receiving a waveform. A property of the waveform is determined in a step 172 and the waveform is assigned a symbol in response to the property in a step 173. The property of the waveform can be, for example, its period, frequency, etc. The property can also be the ratio of the time that the waveform oscillates to a predetermined time, such as $T_{Zero}$. The symbol assigned to the waveform can be an ASCI character, such as a letter or number, or another symbol which is desired to decode.

In one example, the property of the waveform has a one-to-one correspondence to the symbol it represents. For example, a waveform with zero oscillations within the predetermined time is assigned the symbol '0' (zero) and a waveform with one oscillation within the predetermined time is assigned the symbol '1' (one). In another example, waveforms with between zero and three oscillations within the predetermined time are assigned the symbol '0' (zero) and waveforms with between four and seven oscillations within the predetermined time are assigned the symbol '1' (one).

Figure 12B:
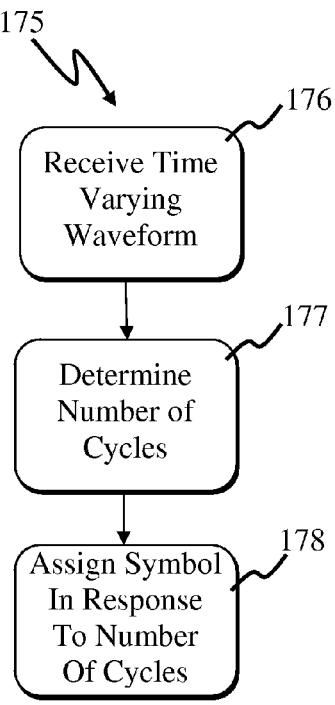

In FIG. 12B, a method 175 of decoding waveforms includes a step 176 of receiving a time varying waveform. The time varying waveform can be sinusoidal, square, triangular, etc. In a step 177, the number of cycles within a predetermined time in the time varying waveform is determined. In a step 178, a symbol is assigned to the time varying waveform in response to the number of cycles within the predetermined time. In some examples, the number of cycles can be full cycles based on the period of the time varying waveform and in other examples, the number of cycles can be based on half or quarter periods of the time varying waveform.

Figure 12C:
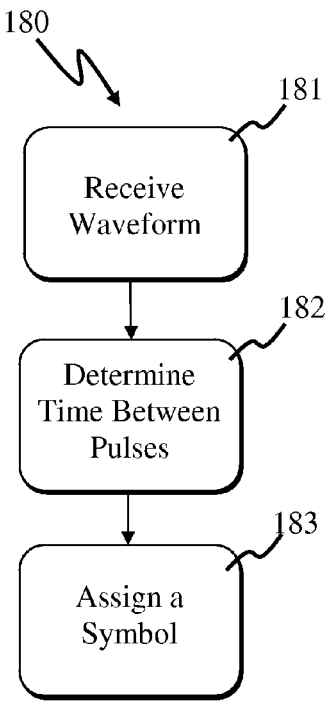

In FIG. 12C, a method 180 of decoding waveforms includes a step 181 of receiving a waveform. In a step 182, the time between pulses in the waveform is determined. In a step 183, a symbol is assigned to the waveform in response to the time between the pulses. In some examples, the time between pulses is compared to a predetermined time, such as time $T_{Zero}$.

Figure 12D:
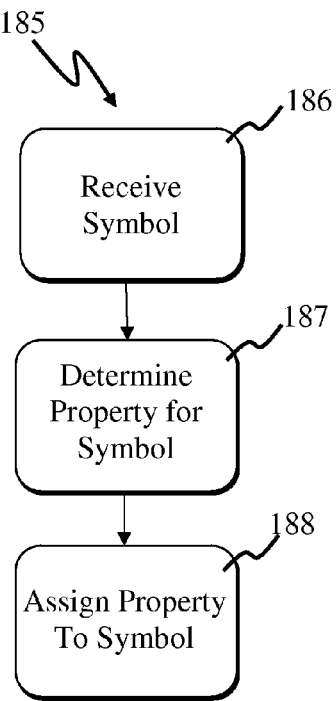
FIGS. 12D-12F are simplified block diagrams of a method of decoding a symbol in accordance with the present invention.

In FIG. 12D, a method 185 of encoding symbols includes a step 186 of receiving a symbol. A property for the symbol is determined in a step 187 and the symbol is assigned a waveform in response to the property in a step 188. The property for the symbol can be, for example, the period, frequency, etc. of the waveform. The property can also be the ratio of the time that the waveform oscillates to a predetermined time, such as $T_{Zero}$. The symbol can be an ASCI character, such as a letter or number, or another symbol which is desired to encode.

Figure 12E:
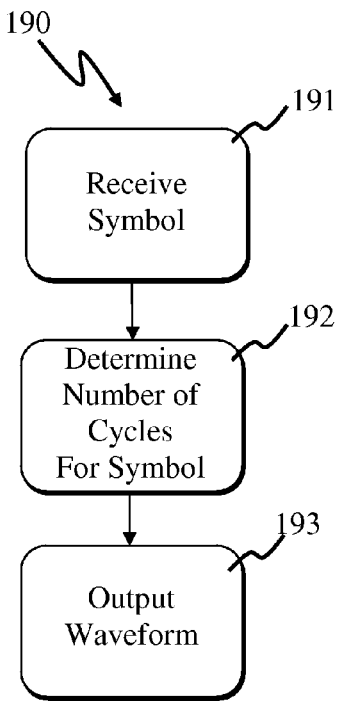

In FIG. 12E, a method 190 of encoding a symbol includes a step 191 of receiving a symbol. In a step 192, the number of cycles of a waveform for the symbol is determined. The number of cycles corresponds to that in the waveform within a predetermined time. In a step 193, the waveform corresponding to the symbol is outputted. In some examples, the number of cycles can be full cycles based on the period of the waveform and in other examples, the number of cycles can be based on half or quarter periods of the waveform.

Figure 12F:
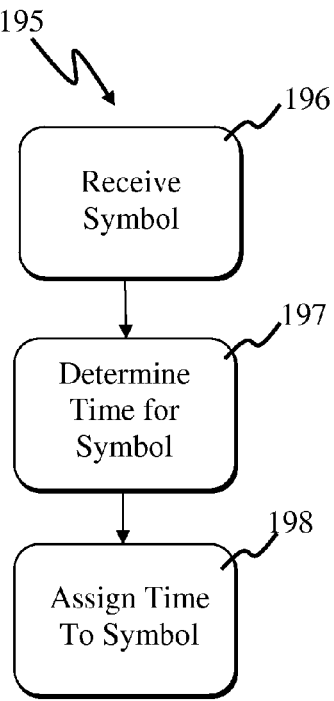

In FIG. 12F, a method 195 of encoding a symbol includes a step 196 of receiving a symbol. In a step 197, a time which corresponds to the symbol is determined. The time corresponds to the time between pulses in a waveform. In a step 198, the time between pulses is assigned to the symbol. The waveform can then be outputted with pulses spaced apart by the time determined in step 197.

The present invention is described above with reference to a preferred embodiment. However, those skilled in the art will recognize that changes and modifications can be made in the described embodiment without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

Having fully described the invention in such clear and concise terms as to enable those skilled in the art to understand and practice the same, the invention claimed is:

1. A method, comprising:
providing a first electrical outlet;
positioning a first controller so it is housed by the first electrical outlet;
establishing communication between a second controller and the first controller, the communication being established through the first electrical outlet; and
connecting a terminal device to the first electrical outlet so it is in communication with the first controller.

2. The method of claim 1, wherein the step of connecting the terminal device to the first electrical outlet includes connecting a data cable to it.

3. The method of claim 1, further including establishing communication between the terminal device and second controller through the first controller.

4. The method of claim 1, wherein the first controller includes a mixed signal microcontroller.

5. The method of claim 4, wherein the first controller includes an isolation circuit which provides isolation for the mixed signal microcontroller.

6. The method of claim 1, further including positioning the second controller so the second controller is housed by a second electrical outlet.

7. A method, comprising:
providing primary and secondary controllers which are carried by first and second electrical outlets, respectively;
determining if a message has been received from a terminal device by the primary controller, wherein the terminal device is in communication with the first controller through a data cable; and
processing the message with the primary controller and flowing it to the secondary controller through a power communication channel between the first and second outlets, wherein the power communication channel flows a power signal.

8. The method of claim 7, wherein the secondary controller determines, in response to the message, a performance parameter of an electrical device connected to the second electrical outlet.

9. The method of claim 8, wherein the secondary controller codes the performance parameter and flows it to the primary controller through the power communication channel.

10. The method of claim 9, wherein the primary controller flows the coded performance parameter to the terminal device through the data cable.

11. A method, comprising:
connecting a terminal device to a first electrical outlet through a data cable, wherein the first electrical outlet houses a primary controller; and
connecting an electrical device to a second electrical outlet which houses a secondary controller;
wherein the primary and secondary controllers are in communication with each other through a communication channel.

12. A method, comprising:
connecting a terminal device to an electrical outlet through a data cable; and
establishing a communication link between first and second controllers, the first controller being carried by the electrical outlet;
wherein the first controller provides information to the second controller, the information corresponding to the operation of an electrical load coupled to the electrical outlet.

13. The method of claim 12, further including controlling the operation of the electrical load with the first controller in response to an indication from the second controller.

14. The method of claim 12, further including positioning a wireless module so the wireless controller is carried by the electrical outlet.

15. The method of claim 12, wherein the communication link is a wireless communication link.

16. The method of claim 12, wherein the first controller provides information to the second controller in response to an indication from the second controller.

17. The method of claim 12, further including controlling the operation of the second controller with the terminal device.

18. The method of claim 12, further including powering the first controller with the electrical outlet.

19. The method of claim 12, further including establishing communication between the first controller and electrical load through a socket of the electrical outlet.

20. A method, comprising:
connecting a terminal device to a first electrical outlet which carries a first controller; and
connecting an electrical device to a second electrical outlet which carries a second controller; and
establishing a communication link between first and second controllers.

21. The method of claim 20, wherein the terminal device and electrical device are in communication with each other through the first and second controllers.

22. The method of claim 20, wherein the communication link is established through a communication channel between the first and second electrical outlets.

23. The method of claim 20, wherein the first controller provides information to the second controller, the information corresponding to the operation of the electrical device.

24. The method of claim 20, wherein the first and second electrical outlets include first and second sockets, respectively.

25. The method of claim 20, further including establishing a power signal between the first and second electrical outlets.

26. The method of claim 25, further including providing power to the first controller with the power signal.

27. The method of claim 25, further including providing power to the second controller with the power signal.

28. The method of claim 25, further including providing power to the terminal device with the power signal.

29. The method of claim 25, further including providing power to the electrical device with the power signal.

30. A method, comprising:
positioning first and second controllers so the first and second controllers are carried by first and second electrical outlets, respectively;
establishing a communication link between the first and second controllers;
flowing a control signal to the first controller through the first electrical outlet with a terminal device; and
coupling an electrical load to the second electrical outlet;

wherein the first controller provides a first signal to the second controller and the second controller provides a second signal to the first controller in response, the second signal including information about the operation of the electrical device.

31. The method of claim 30, wherein the first and second controllers are in different rooms.

32. The method of claim 30, wherein the terminal device receives information about the operation of the electrical device in response to the control signal.

33. The method of claim 30, wherein the second controller includes a switch for controlling the operation of the electrical device.

34. The method of claim 30, further including a wireless module included in at least one of the first and second controllers.

35. The method of claim 30, wherein the terminal device communicates with the first controller through a data cable coupled to the first electrical outlet.

36. The method of claim 30, wherein the first and second electrical outlets include first and second outlet housings, respectively, which carry corresponding first and second controllers.

37. A method, comprising:
positioning first and second controllers so the first and second controllers are carried by first and second electrical outlets, respectively;
establishing a communication link between the first and second controllers;
flowing a control signal to the first controller through the first electrical outlet with a terminal device; and
coupling an electrical load to the second electrical outlet;
wherein the first controller provides a first signal to the second controller and the second controller provides a second signal to the first controller in response.

38. The system of claim 37, wherein the second signal includes information about the operation of the electrical device.

39. The system of claim 37, wherein the terminal device receives information about the operation of the electrical device in response to the control signal.

40. The system of claim 37, wherein the second controller includes a mixed signal controller for controlling the operation of the electrical device.

41. The method of claim 40, wherein the first controller includes an isolation circuit which provides isolation for the mixed signal microcontroller.

42. The method of claim 37, further including controlling the operation of the electrical load with the first controller in response to an indication from the second controller.

43. The method of claim 37, further including controlling the operation of the electrical load with the terminal device in response to an indication from the second controller.

* * * * *